US012233519B2

(12) United States Patent
Foley et al.

(10) Patent No.: US 12,233,519 B2
(45) Date of Patent: Feb. 25, 2025

(54) TENSIONING DEVICE

(71) Applicant: Enerpac Tool Group Corp., Menomonee Falls, WI (US)

(72) Inventors: Thomas Foley, Wolverhampton (GB); Bryan Hall, Shropshire (GB); Barry Fallon, Birmingham (GB); Evangelia Angelaki, Birmingham (GB); Joe Vernam, Darlaston (GB)

(73) Assignee: Enerpac Tool Group Corp., Menomonee Falls, WI (US)

( * ) Notice: Subject to any disclaimer, the term of this patent is extended or adjusted under 35 U.S.C. 154(b) by 354 days.

(21) Appl. No.: 17/704,724

(22) Filed: Mar. 25, 2022

(65) Prior Publication Data

US 2022/0331939 A1 Oct. 20, 2022

Related U.S. Application Data

(63) Continuation-in-part of application No. PCT/US2020/052818, filed on Sep. 25, 2020.

(Continued)

(51) Int. Cl.
*B25B 29/02* (2006.01)

(52) U.S. Cl.
CPC .................................... *B25B 29/02* (2013.01)

(58) Field of Classification Search
CPC .............................. B25B 19/067; B25B 29/02
See application file for complete search history.

(56) References Cited

U.S. PATENT DOCUMENTS

| | | | | |
|---|---|---|---|---|
| 4,074,890 A * | 2/1978 | Boudet | B25B 29/02 | 976/DIG. 185 |
| 4,314,690 A * | 2/1982 | Mlynarik | B25B 29/02 | 81/57.38 |

(Continued)

FOREIGN PATENT DOCUMENTS

| | | |
|---|---|---|
| WO | 9414578 A1 | 7/1994 |
| WO | 0051791 A1 | 9/2000 |
| WO | 2010054959 A1 | 5/2010 |

OTHER PUBLICATIONS

International Search Report with Written Opinion for related Application No. PCT/US2020/052818 dated Mar. 19, 2021 (15 Pages).

(Continued)

*Primary Examiner* — David B. Thomas
(74) *Attorney, Agent, or Firm* — Andrus Intellectual Property Law, LLP

(57) ABSTRACT

A tensioning device, a tensioning system, and a method of applying tension with a tensioning system. The tensioning device may include a tensioning module including a piston and a tensioning housing supporting the piston for movement, the piston being operable to transmit force to a pulling member configured to engage a workpiece and to transmit a tensile load to the workpiece, the tensioning housing defining a tensioning port configured to receive pressurized fluid to move the piston from an initial position toward a tensioning position; and a retract module including a retract housing positioned in a stacked configuration on the tensioning housing, the retract housing defining a retract port configured to receive pressurized fluid to move the piston from the tensioning position toward the initial position.

20 Claims, 30 Drawing Sheets

Related U.S. Application Data

(60) Provisional application No. 62/906,514, filed on Sep. 26, 2019.

(56) References Cited

U.S. PATENT DOCUMENTS

| | | | | | |
|---|---|---|---|---|---|
| 4,708,036 | A * | 11/1987 | Vossbrinck | B25B 29/02 81/57.38 |
| 4,998,453 | A * | 3/1991 | Walton | B25B 29/02 81/57.38 |
| 7,140,824 | B2 * | 11/2006 | Bucknell | B25B 29/02 411/14 |
| 9,248,532 | B2 | 2/2016 | Wagner et al. | |
| 11,897,102 | B2 * | 2/2024 | Evans | B25B 29/02 |
| 11,911,883 | B2 * | 2/2024 | Lange | B25B 29/02 |
| 2011/0192257 | A1 * | 8/2011 | Armstrong | B25B 29/02 81/57.38 |
| 2011/0271798 | A1 | 11/2011 | Wagner et al. | |
| 2017/0282312 | A1 * | 10/2017 | Alegre | B25B 29/02 |
| 2017/0334049 | A1 | 11/2017 | Dumelow | |
| 2019/0210203 | A1 * | 7/2019 | Evans | B25B 29/02 |
| 2022/0032433 | A1 * | 2/2022 | Lange | B25B 29/02 |
| 2022/0410356 | A1 * | 12/2022 | Evans | B25B 29/02 |
| 2024/0017386 | A1 * | 1/2024 | Jarvis | B23P 19/067 |

OTHER PUBLICATIONS

International Preliminary Report on Patentability for Application No. PCT/US2020/052818 dated Mar. 15, 2022 (7 pages).

Combined Search and Examination Report issued on GB Application No. 2311035.6, dated Nov. 14, 2023.

* cited by examiner

TENSIONING DEVICE

RELATED APPLICATIONS

This application is a continuation-in-part of PCT Patent Application No. PCT/US2020/052818, filed Sep. 25, 2020, which claims priority to U.S. Provisional Patent Application No. 62/906,514, filed on Sep. 26, 2019, the entire contents of both of which are hereby incorporated by reference.

FIELD

The present disclosure relates to tensioning systems, and specifically to hydraulic bolt tensioners.

SUMMARY

Tensioning systems apply tension to one or more bolts to ensure a predetermined clamping force across a joint. Tensioning systems apply an axially load to each bolt (or bolts) to preload the bolt. Mechanical force is applied in an axial direction rather than by applying torque, thereby eliminating inaccuracies caused by friction between a nut and a seating surface and in thread contact surfaces.

In one aspect, a tensioning device for tensioning a workpiece includes a plurality of tensioning modules in a stacked configuration.

In another aspect, a tensioning device is provided for tensioning a workpiece. The tensioning device receiving pressurized fluid from a fluid source to move a piston. The tensioning device further including an auxiliary drive actuated by the pressurized fluid, the auxiliary drive rotating a nut.

In yet another aspect, a tensioning device for tensioning a workpiece includes a plurality of tensioning modules in a stacked configuration, adjacent tensioning modules engaging one another along a stepped interface.

In yet another aspect, a tensioning device for tensioning a workpiece includes a relief valve for controlling pressure applied against a piston.

In yet another aspect, a tensioning device for tensioning a workpiece includes a check valve for controlling piston over-stroke.

In yet another aspect, a tensioning device for tensioning a workpiece is capable of using pressurized fluid to return a piston to an initial position.

In yet another aspect, a tensioning device for tensioning a workpiece includes a plurality of tensioning modules, the tensioning modules forming an integral manifold permitting fluid communication between the modules.

In an independent aspect, a tensioning device for tensioning a workpiece includes a pulling member configured to engage the workpiece and transmit a tensile load to the workpiece; and a plurality of tensioning modules positioned in a stacked configuration relative to one another. Each tensioning module includes a piston operable to transmit a force to the pulling member and an inlet configured to receive pressurized fluid to move the piston.

In some aspects, each of the plurality of tensioning modules is operable to engage an adjacent tensioning module to mutually support the plurality of tensioning modules together.

In some aspects, the piston abuts a piston of the adjacent one of the tensioning modules.

In some aspects, the fluid passes through a manifold prior to entry into each tensioning module.

In some aspects, the tensioning device further includes a base module supporting the pulling member relative to a reaction surface, the base module positioned adjacent an end of the pulling member configured to engage the workpiece; and a cap module coupled to a distal end of the pulling member. The tensioning modules are positioned between the base module and the cap module.

In some aspects, at least one tensioning module is a different size when compared with the other tensioning modules.

In some aspects, the plurality of tensioning modules include a first tensioning module having a first manifold and a second tensioning module having a second manifold. The first tensioning module and the second tensioning module are stacked such that the first manifold and the second manifold are in fluid communication with one another.

In some aspects, the pulling member is configured to transmit a tensile load to the workpiece along a pulling axis, and the plurality of tensioning modules are stacked along the pulling axis.

In another independent aspect, a tensioning device for tensioning a workpiece includes a pulling member configured to engage the workpiece and transmit a tensile load on the workpiece; a piston positioned within a chamber and coupled to the pulling member, the piston movable in response to force exerted on the piston by pressurized fluid from a fluid source; an output member configured to transmit a torque to and rotate a nut engaging the workpiece; and an auxiliary drive operable to drive the output member, the auxiliary drive actuated by the pressurized fluid.

In some aspects, the auxiliary drive includes a motor, and the motor applies a force to a gear for transmitting torque to the output member to rotate the nut.

In some aspects, the tensioning device further includes an outlet operable to release the pressurized fluid.

In some aspects, the pressurized fluid can be supplied to the tensioning device and drained from the tensioning device in cycles until a desired load has been imparted to the workpiece.

In some aspects, the auxiliary drive includes a drive piston movable in response to the pressurized fluid.

In some aspects, the auxiliary drive includes a gear coupled to the drive piston, and the gear includes a cam surface. Movement of the drive piston causes the cam surface of the gear to engage a cam member, thereby causing rotation of the gear.

In some aspects, the auxiliary drive includes a ratcheting pawl movable in response to movement of the drive piston, movement of the drive piston in a first direction causing the pawl to transmit a torque to the output member, movement of the piston in a second direction causing the pawl to ratchet without transmitting torque to the output member.

In some aspects, the auxiliary drive includes a drive piston, a rack coupled to the drive piston, and a pinion gear engaged by the rack. Movement of the drive piston causes movement of the rack, thereby driving the pinion gear.

In some aspects, the tensioning device further includes a spring return biasing the drive piston towards an initial position.

In another independent aspect, a tensioning device for tensioning a workpiece includes a plurality of tensioning modules in a stacked configuration, each tensioning module including a piston, the piston of each tensioning module abutting an adjacent piston of an adjacent tensioning module; a first inlet configured to receive pressurized fluid from a first fluid source to move a piston from an initial position to a tensioning position; and a second inlet configured to receive pressurized fluid from a second fluid source to move the piston from the tensioning position toward the initial position.

In some aspects, the first inlet is positioned below the piston and the second inlet is positioned above the piston.

In some aspects, the first inlet receives pressurized fluid to advance the piston toward an extended position.

In some aspects, the tensioning device further includes a relief valve for controlling pressure applied against the piston.

In some aspects, the relief valve is actuated in the event of over-pressurization of the tensioning device.

In some aspects, the relief valve is configured to open once a predetermined pressure is reached.

In some aspects, the second inlet receives pressurized fluid to retract the piston toward a retracted position.

In some aspects, the first inlet receives pressurized fluid to advance the piston toward an extended position and the second inlet receives pressurized fluid to retract the piston toward a retracted position in a repeatable cycle.

In some aspects, the tensioning device further includes an auxiliary drive operable to rotate a nut.

In some aspects, the auxiliary drive rotates the nut during the repeatable cycle of advancement and retraction of the piston.

In yet another independent aspect, a tensioning device for tensioning a workpiece includes a plurality of tensioning modules in a stacked configuration, each tensioning module including a piston, the piston of each tensioning module abutting an adjacent piston of an adjacent tensioning module; an inlet configured to receive pressurized fluid from a fluid source to move the piston, the inlet in fluid communication with an internal passageway of each of the plurality of tensioning modules; and a relief valve for controlling pressure applied against a piston, the relief valve in fluid communication with the internal passageway of the tensioning device.

In some aspects, the relief valve is actuated in the event of over-pressurization of the tensioning device.

In some aspects, the relief valve is configured to open once a predetermined pressure is reached.

In some aspects, the relief valve is configured to open once the piston reaches a maximum stroke.

In some aspects, the relief valve provides a closed path for the pressurized fluid to be diverted to a fluid supply.

In some aspects, the fluid supply is a tank, and the diverted pressurized fluid may be re-introduced into the inlet to move the piston.

In another independent aspect, a tensioning device for tensioning a workpiece includes a first tensioning module including a first housing and a first piston supported in the first housing, the first housing having an outer surface, the first piston coupled to a pulling member; a second tensioning module including a second housing and a second piston supported in the second housing, the second housing having an outer surface, the second piston coupled to the pulling member, the second tensioning module engaging the first tensioning module in a stacked relationship; and a coupling feature positioned on at least one of the first tensioning module and the second tensioning module, the coupling feature engaging the other of the first tensioning module and the second tensioning module.

In some aspects, the coupling feature includes an inner wall on one of the first tensioning module and the second tensioning module and an outer wall on the other of the first tensioning module and the second tensioning module that is complementary to the inner wall, the inner wall and the outer wall abutting one another in a radial direction relative to a tensioning axis.

In some aspects, the coupling feature includes a first step surface positioned on one of the first tensioning module and the second tensioning module and complementary surface positioned on the other of the first tensioning module and the second tensioning module.

In some aspects, the coupling feature provides wall entrapment to restrain the plurality of tensioning modules from deflection radially outwardly from the tensioning axis.

In yet another independent aspect, a tensioning device for tensioning a workpiece includes a first tensioning module including a first housing and a first piston supported in the first housing, the first piston defining a first load surface area; and a second tensioning module including a second housing and a second piston supported in the second housing, the second piston defining a second load surface area, the combination of the first load surface and the second load surface creates a combined effective load surface, thereby multiplying the net tensioning force exerted on the pulling member.

In some aspects, each tensioning module of the plurality of tensioning modules is removably coupled to at least one adjacent tensioning module.

In some aspects, each tensioning module includes a piston.

In some aspects, the tensioning module surface area is defined by the piston, the tensioning module surface area contributing to the tensile force for operating the tensioner.

In some aspects, the tensioning module surface area is defined by an upper surface of the piston of the tensioning module, the upper surface of one piston abutting a lower end of an adjacent piston of another tensioning module.

In some aspects, the tensioner surface area can be adjusted by removably coupling a tensioning module from the plurality of tensioning modules.

In another independent aspect, a tensioning device for tensioning a workpiece includes a first tensioning module including a first housing, a first piston supported in the first housing, and a first manifold; and a second tensioning module including a second housing, a second piston supported in the second housing, and a second manifold. The first tensioning module is stacked with the second tensioning module such that the first manifold and second manifold fluidly communicate in a common manifold.

In some aspects, the tensioning device further includes a piston. The common manifold is in fluid communication with an inlet configured to receive pressurized fluid from a fluid source to move the piston.

In some aspects, the common manifold is in fluid communication with a relief valve.

In some aspects, the relief valve is operable to open to permit fluid egress from the first tensioning module and the second tensioning module.

In some aspects, the first manifold is integrated within the first tensioning modules.

In some aspects, the manifold is a separate component external to each tensioning module, the manifold being in fluid communication with each tensioning module.

In another independent aspect, a tensioning device may generally include a tensioning module including a piston and a tensioning housing supporting the piston for movement, the piston being operable to transmit force to a pulling member configured to engage a workpiece and to transmit a tensile load to the workpiece, the tensioning housing defining a tensioning port configured to receive pressurized fluid to move the piston from an initial position toward a tensioning position; and a retract module including a retract housing positioned in a stacked configuration on the tensioning housing, the retract housing defining a retract port configured to receive pressurized fluid to move the piston from the tensioning position toward the initial position.

In yet another independent aspect, a tensioning system may generally include a first tensioning device and a second tensioning device. The first tensioning device may include a tensioning module including a piston and a tensioning housing supporting the piston for movement, the piston being operable to transmit force to a first pulling member configured to engage a first workpiece and to transmit a tensile load to the first workpiece, the tensioning housing defining a tensioning port configured to receive pressurized fluid to move the piston from an initial position toward a tensioning position, and a retract module including a retract housing positioned in a stacked configuration on the tensioning housing, the retract housing defining a first retract port configured to receive pressurized fluid to move the piston from the tensioning position toward the initial position and a second retract port configured to receive pressurized fluid from the first retract port. The second tensioning device may include a tensioning module including piston and a tensioning housing supporting the piston for movement, the piston being operable to transmit force to a second pulling member configured to engage a second workpiece and to transmit a tensile load to the second workpiece, the tensioning housing defining a tensioning port configured to receive pressurized fluid to move the piston from an initial position toward a tensioning position, and a retract module including a retract housing positioned in a stacked configuration on the tensioning housing, the retract housing defining a second tensioning device retract port configured to receive pressurized fluid to move the piston from the tensioning position toward the initial position, the second tensioning device retract port being in fluid communication with and receiving pressurized fluid from the second retract port of the first tensioning device.

In a further independent aspect, a method of applying tension with a tensioning system including a tensioning device may be provided. The tensioning device may include a tensioning module with a piston and a tensioning housing supporting the piston for movement, the tensioning housing defining a tensioning port, and a retract module with a retract housing positioned in a stacked configuration on the tensioning housing, the retract housing defining a retract port. The method may generally include receiving pressurized fluid through the tensioning port to move the piston from an initial position toward a tensioning position so that the piston transmits force to a pulling member configured to engage a workpiece and to transmit a tensile load to the workpiece; and thereafter, receiving pressurized fluid through the retract port to move the piston from the tensioning position toward the initial position.

Other independent aspects will become apparent by consideration of the detailed description, claims and accompanying drawings.

DETAILED DESCRIPTION

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects may be implemented in software (for example, stored on non-transitory computer-readable medium) executable by one or more processing units, such as a microprocessor, an application specific integrated circuits ("ASICs"), or another electronic device. As such, it should be noted that a plurality of hardware- and software-based devices, as well as a plurality of different structural components may be utilized to implement some aspects. For example, "controllers" described in the specification may include one or more electronic processors or processing units, one or more computer-readable medium modules, one or more input/output interfaces, and various connections (for example, a system bus) connecting the components.

Figure 1:
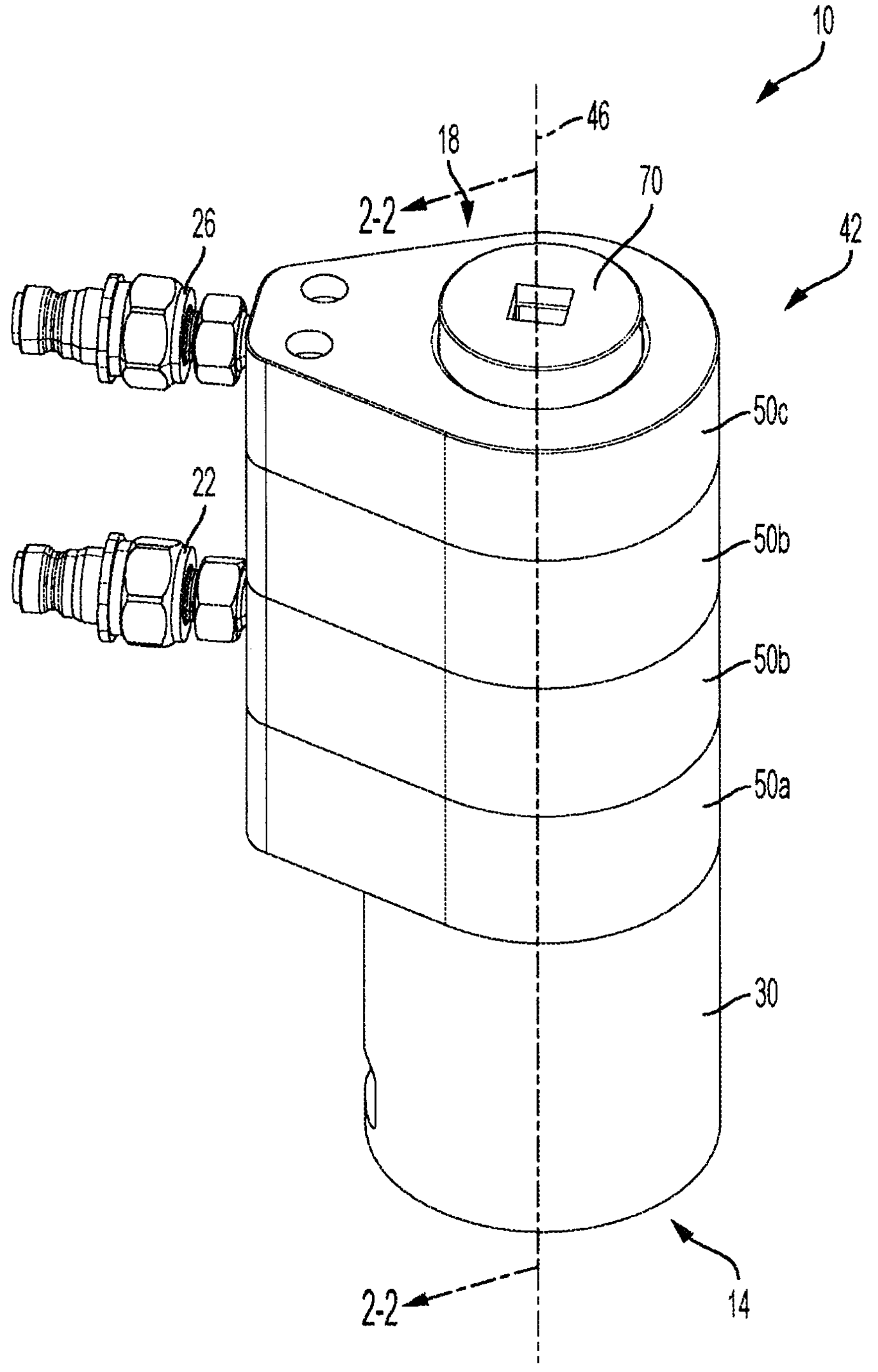
FIG. 1 is a perspective view a hydraulic tensioner.
Figure 2:
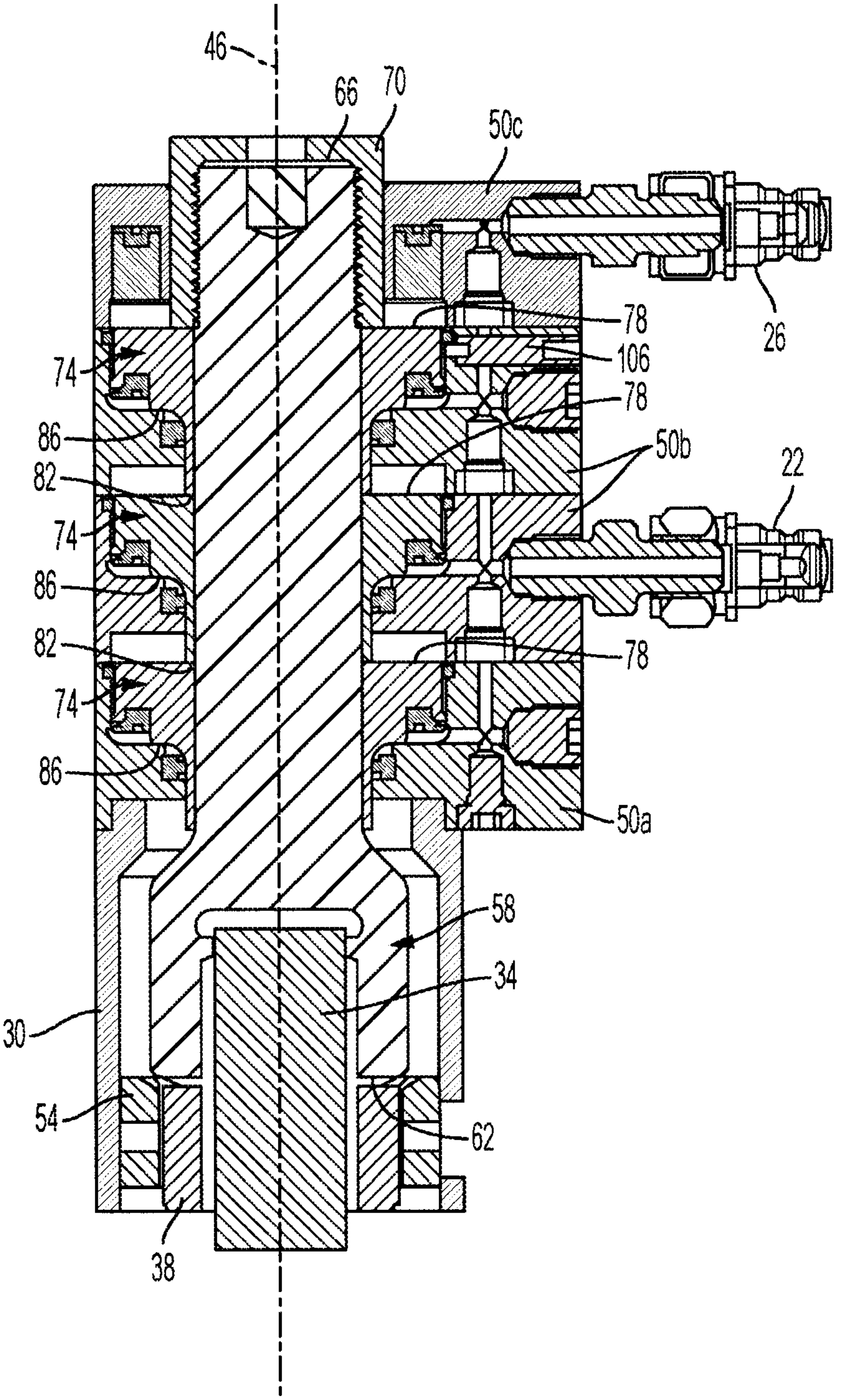
FIG. 2 is a section view of the hydraulic tensioner of FIG. 1, viewed along section 2-2.

FIG. 1 illustrates a tensioning device or tensioner 10 for applying tensile force to a workpiece, such as a bolt 34 (FIG. 2). The tensioner 10 includes a first end or working end 14 and a second end 18 opposite the working end 14. The tensioner 10 also includes an inlet coupling 22 and an outlet coupling 26. The tensioner 10 includes a housing 30 positioned adjacent the working end 14, and a stacked tensioning module assembly 42 coupled to the housing 30 and oriented along a tensioning axis 46. In the illustrated embodiment, the stacked tensioning module assembly 42 includes three tensioning modules 50; in other embodiments, the tensioner 10 may include fewer or more tensioning modules 50.

As shown in FIG. 2, the tensioner 10 includes a coupler 54 positioned adjacent the working end 14, and a rod 58 extending through the tensioning modules 50. The rod 58 includes a first end 62 that is configured to engage (e.g., by a threaded connection) an end of a workpiece, such as a bolt 34. A second end 66 of the rod 58 is positioned adjacent the second end 18 of the tensioner 10. In the illustrated embodiment, the second end 66 is coupled (e.g., by a threaded connection) to a cap 70. The coupler 54 engages a nut 38 that is engaged with the bolt 34 (e.g., by a threaded connection).

The tensioner 10 includes multiple modules 50 that are positioned in a stacked configuration. In the illustrated embodiment, each module 50 has a teardrop-shaped profiled and the tensioner includes a base tensioning module **50*a*, a cap module 50*c*, and two supplemental or intermediate tensioning modules 50*b*. The base tensioning module 50*a* is directly coupled to the housing 30, while the cap module 50*c* is positioned at the upper end of the tensioning module assembly. The intermediate tensioning modules 50*b* are positioned between the base tensioning module 50*a* and the cap module 50*c* and include an annular aperture through which the rod 58 passes. Each tensioning module 50*a*, 50*b* (that is, the base tensioning module 50*a* and each supplemental tensioning module 50*b*) includes a piston 74 that is supported for movement parallel to the tensioning axis 46. In the illustrated embodiment, an upper surface 78 of one piston 74 abuts a lower end 82 of an adjacent piston 74 positioned above it. In addition, the piston 74 of the uppermost tensioning module 50 abuts the cap 70. Since the cap 70 is secured to the rod 58 by threaded engagement, the forces exerted on each piston in the base module 50*a* and supplemental modules 50*b* is transmitted to the rob 58**.

Each tensioning module 50 defines a surface area on a surface (e.g., the lower surface 86) of the piston 74 for contributing to the tensile force for tensioning the workpiece. The surface area contributing to the tensile force exerted on the workpiece 34 is increased by securing subsequent tensioning modules 50 to the tensioner 10. In other words, the addition of supplemental tensioning modules 50 increases the effective surface area against which the pressurized fluid acts, thereby providing a force multiplier and increasing a tensile force exerted on the workpiece. Moreover, an increased surface area contributing to the tensile force permits operation of the tensioner 10 at a lower pressure than conventional tensioning devices while still exerting a similar tensile force. For example, in some embodiments, the tensioner 10 is capable of operating at 700 bar of pressure while exerting a tensile force equivalent to traditional bolt tensioners operating at 1000-1800 bar on the workpiece or bolt 34. Lowering operating pressure of the tensioner 10 results in cost savings, as less money is spent on pressurizing inlet fluid.

Another advantage of the tensioner 10 is that the tensioning modules 50 are removably secured to the tensioner 10. Thus, a user can adjust the surface area contributing to the tensile force on-site, as needed, by simply adding or removing a tensioning module 50 to the assembly. This permits to the tensioner 10 to be used in a wide range of operating possibilities depending on the required force to be exerted on the workpiece 34.

During operation, each of the tensioning modules **50*a*, 50*b* receives pressurized fluid from a fluid source (e.g., a pump—not shown) via the inlet coupling 22. The pressurized fluid exerts pressure against a lower surface 86 of each piston 74, thereby exerting a force on the rod 58 (e.g., via the cap 70) and generating a tensile load on the workpiece/bolt 34. While the rod 58 exerts a tensile load on the workpiece, a torque may be applied to rotate the coupler 54, thereby tightening the nut 38. In some embodiments, the torque may be applied manually (e.g., by a tommy bar); in other embodiments, the torque may be applied by a motor (e.g., a drive motor having an output gear that drives a gear surface of the coupler 54). After the nut 38** is tightened, the hydraulic pressure may be released, and the cycle may be repeated until a desired preload has been imparted to the workpiece.

Figure 3A:
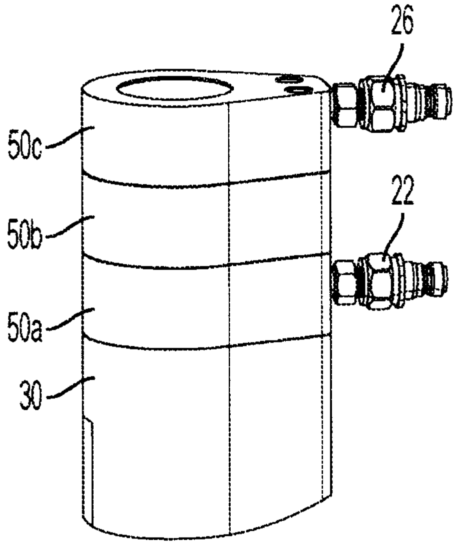
FIGS. 3A-3D illustrate a process for modifying a configuration of the hydraulic tensioner of FIG. 1.
Figure 3B:
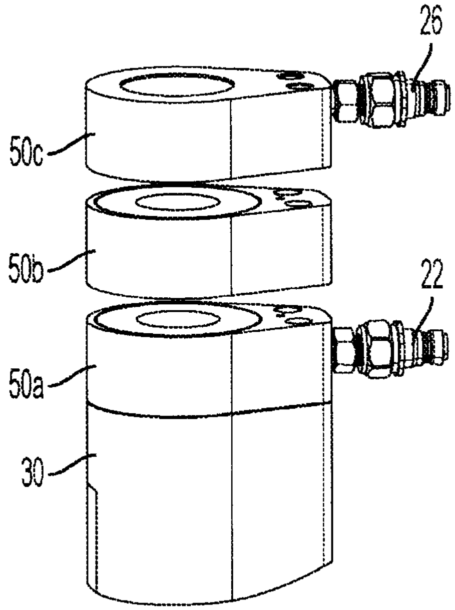
Figure 3C:
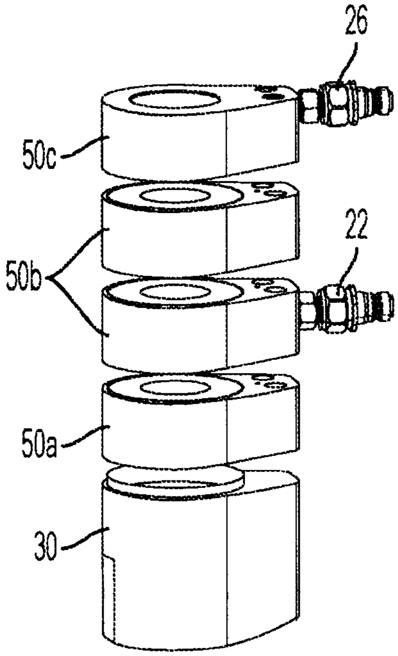
Figure 3D:
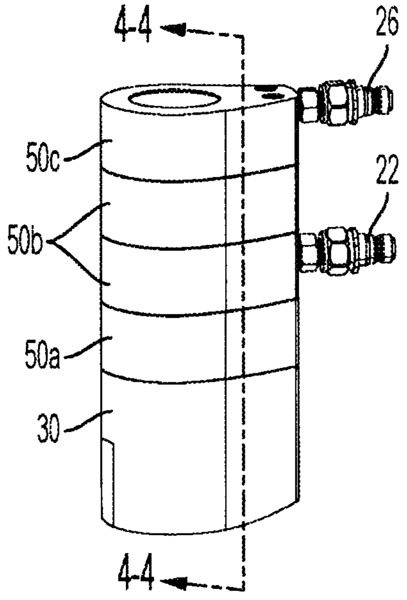

In some circumstances, one tensioning module may not generate sufficient tensile force, or a user may need to generate a required tensile load while using a fluid source having a lower pressure output. The tensioner 10 permits additional tensioning modules 50*b* to be added as necessary to generate the necessary tensile force. For example, FIG. 3A illustrates a tensioner 10 including two tensioning modules 50*a*, 50*b*. As shown in FIGS. 3B and 3C, an additional tensioning module 50*b* may be positioned in the stack in order to generate a larger tensile force. The modules 50 can be stacked together (FIG. 3D) around the rod 58 (FIG. 2), and the cap 70 is secured to the second end 66 of the rod 58 to secure the modules 50.

In some embodiments, the tensioner 10 can be used to generate the required preload force using a pressure supply of 700 bar. By using a lower pressure supply, the tensioner 10 can generate faster flow, increasing productivity. In addition, the use of lower pressure permits reduction in material sections for the tensioner 10, and reduces overall risk of use for an operator. Furthermore, the tensioner 10 require s a shorter stroke length, thereby permitting the use of tensioning modules 50 having a lower height. In some embodiments, the tensioner 10 can be configured to provide a triple stage tensioner in a similar space envelope as a conventional tensioner.

Figure 4:
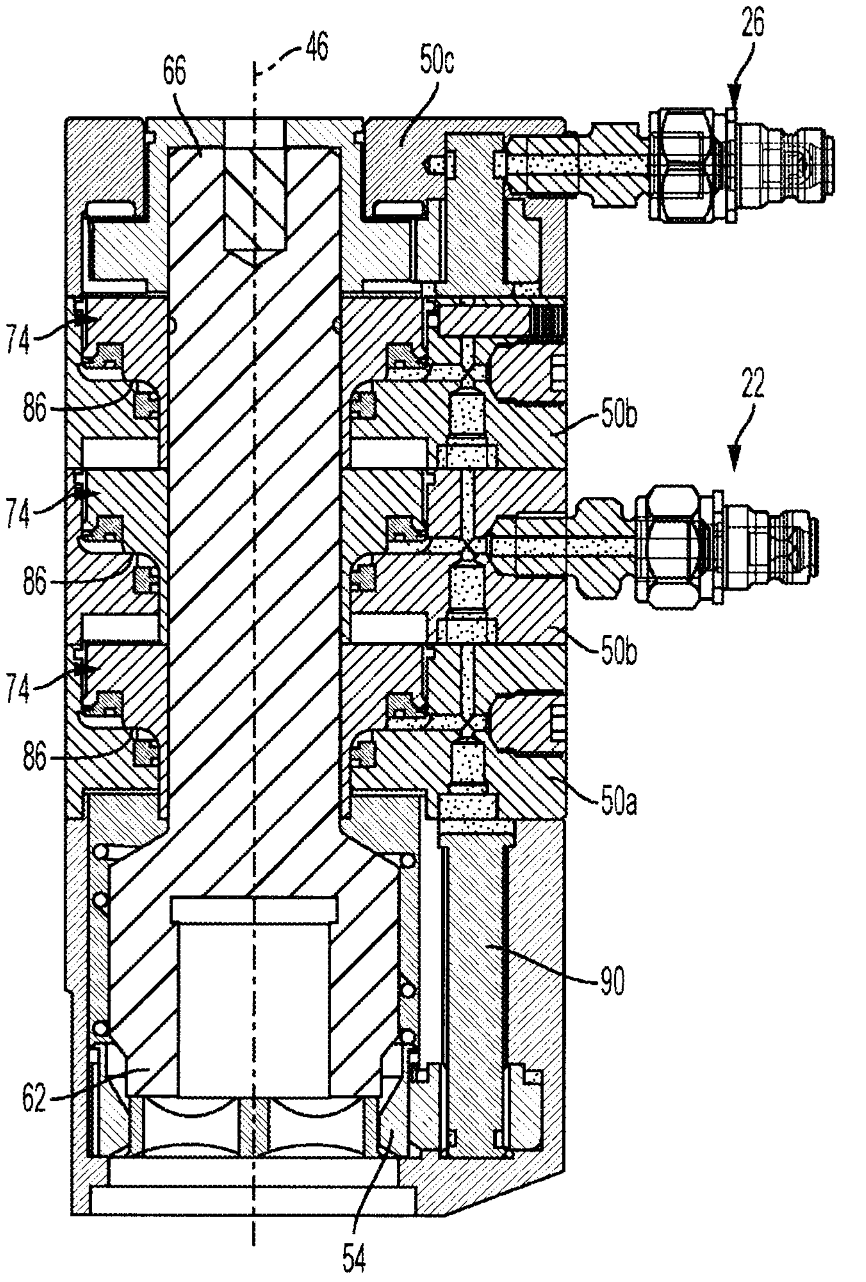
FIG. 4 is a section view of a hydraulic tensioner, viewed along section 4-4 in FIG. 3D.
Figure 5:
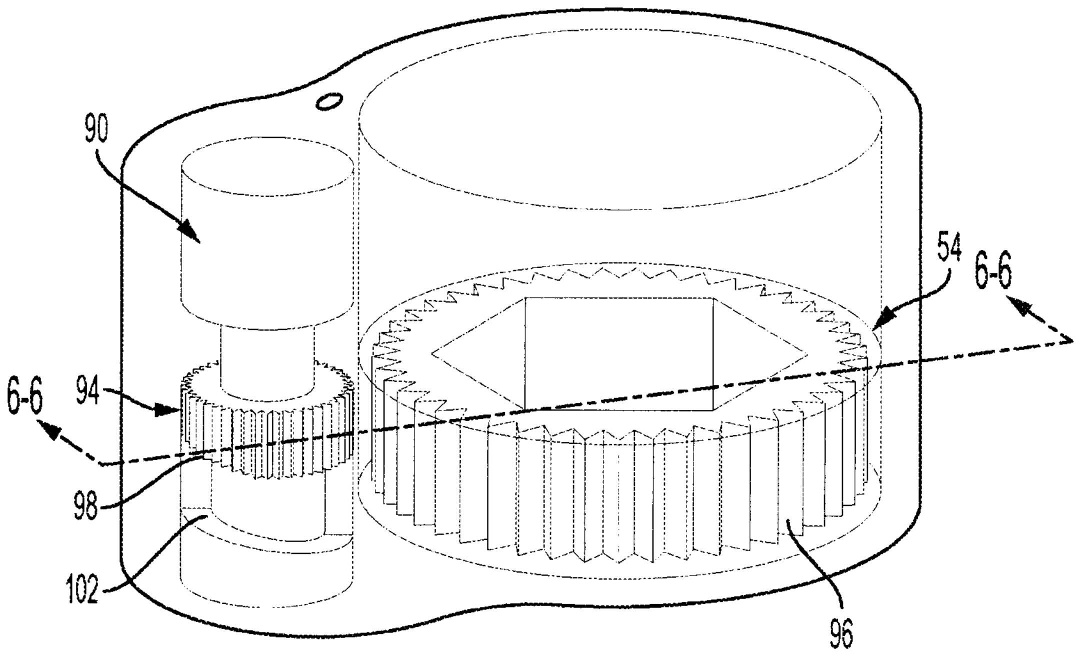
FIG. 5 is a perspective view of a rotation drive.
Figure 6:
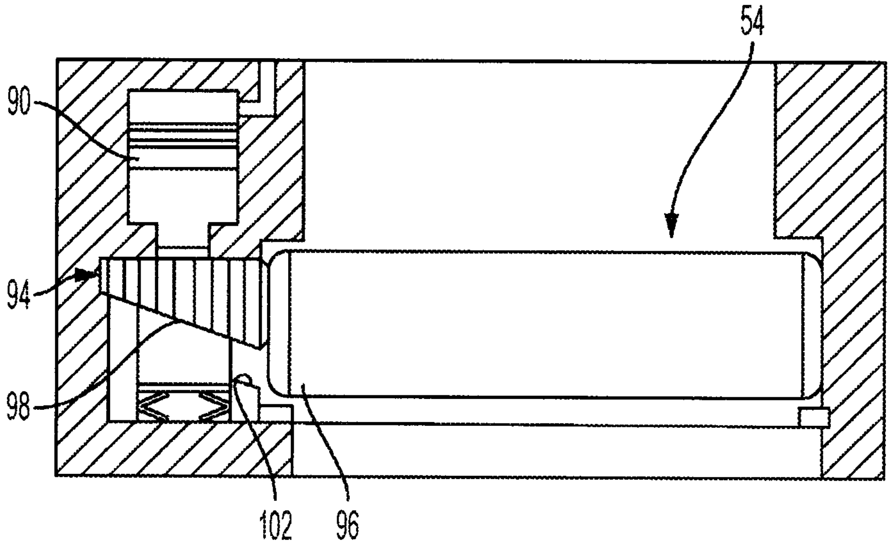
FIG. 6 is a section view of the rotation drive of FIG. 5, viewed along section 6-6.

Referring now to FIGS. 4-6, the tensioner 10 includes a drive mechanism for rotating the nut 38 using the pressurized fluid supplied to the tensioner 10. For example, the tensioner 10 includes a drive piston 90 in fluid communication with the inlet coupling 22. In addition to exerting a force on the lower surface 86 of the pistons 74, the pressurized fluid exerts pressure on a drive piston 90 to move the drive piston 90. As shown in FIGS. 5 and 6, the drive piston 90 includes a gear 94 having an inclined end surface 98. Movement of the drive piston 90 causes the inclined end surface 98 to engage a cam surface 102, thereby rotating the gear 94. The rotation of the gear 94 engages an outer gear surface 96 of the coupler 54, thereby driving the coupler 54 and tightening the nut 38.

Figure 7:
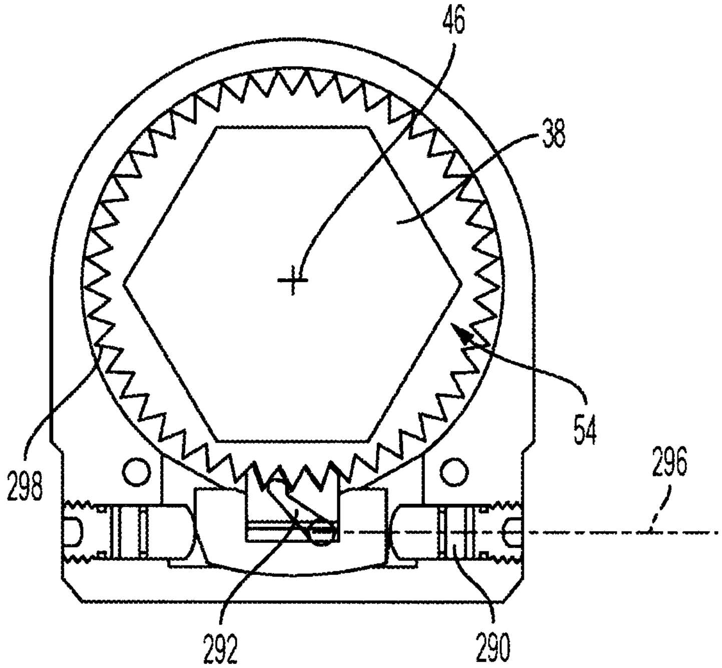
FIG. 7 is a section view of a rotation drive according to another embodiment, viewed along a section transverse to a tensioning axis.

FIG. 7 illustrates a drive mechanism according to another example. The drive mechanism includes a drive piston 290 and a ratcheting pawl 292. The drive piston 290 is oriented along an axis 296 that is transverse to the tensioning axis 46. The pawl 292 engages an outer gear surface 298 of the coupler 54. As the drive piston 290 is pressurized, the drive piston 290 moves along the transverse axis 296, thereby causing the pawl 292 to move along the transverse axis 296 and drive the coupler 54 to rotate. The drive piston 290 and pawl 292 can be biased by retract pressure or spring return forces to return to an initial position (e.g., toward the right in FIG. 7), and the pawl 292 ratchets relative to the outer gear surface 298 of the coupler 54 as the drive piston 290 and pawl 292 return to the initial position.

Figure 8:
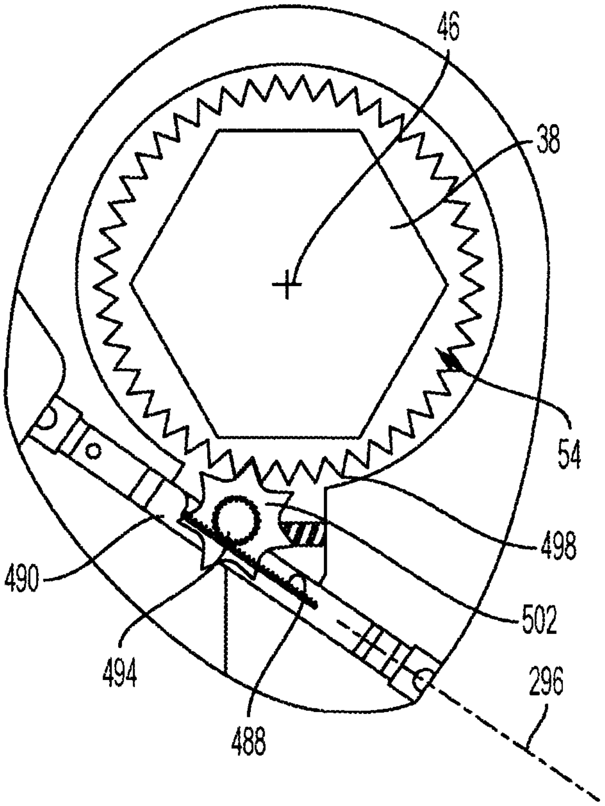
FIG. 8 is a section view of a rotation drive according to another embodiment, viewed along a section transverse to a tensioning axis.

FIG. 8 illustrates a drive mechanism according to yet another example. The drive mechanism includes a drive piston 490 and a pinion gear 494. The drive piston 490 includes a toothed rack 488 engaging the pinion gear 494, and the drive piston 490 is oriented along an axis 496 that is transverse to the tensioning axis 46. As the drive piston 490 is pressurized, the drive piston 490 moves along the axis 496, causing the rack 488 to rotate the pinion gear 494. The pinion gear 494 is coupled to a drive gear 502 that engages an outer gear surface 498 of the coupler 54. Rotation of the pinion gear 494 therefore causes the drive gear 502 to rotate the coupler 54. The drive piston 490 can be biased by retract pressure or spring return to return to an initial position (e.g., the position shown in FIG. 8), and the drive gear 502 can be oriented to ratchet relative to the outer gear surface 498 of the coupler 54 as the drive piston 490 returns to its initial position.

Figure 9A:
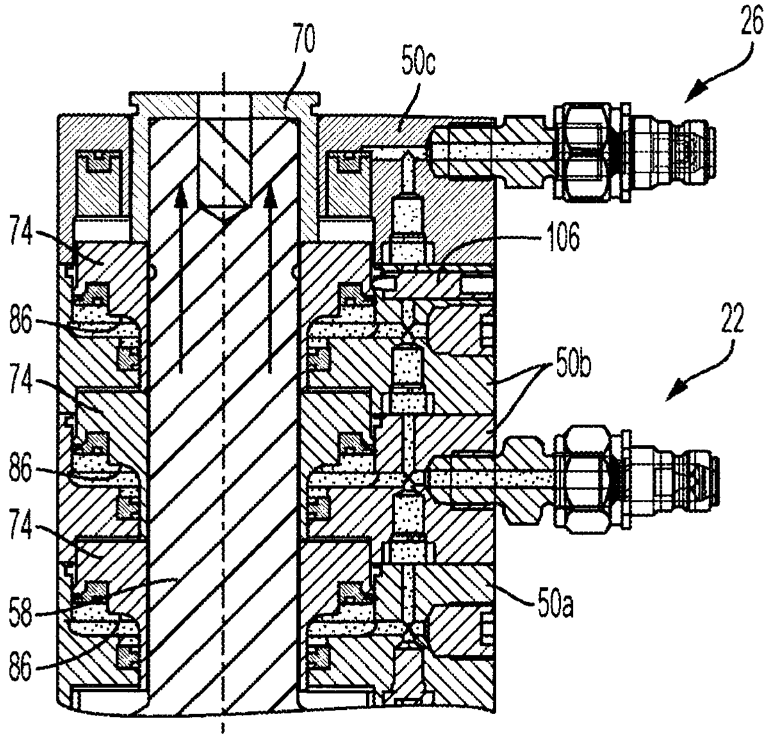
FIGS. 9A-9D illustrate a tensioning cycle including a fluid-assisted return stage.
Figure 9B:
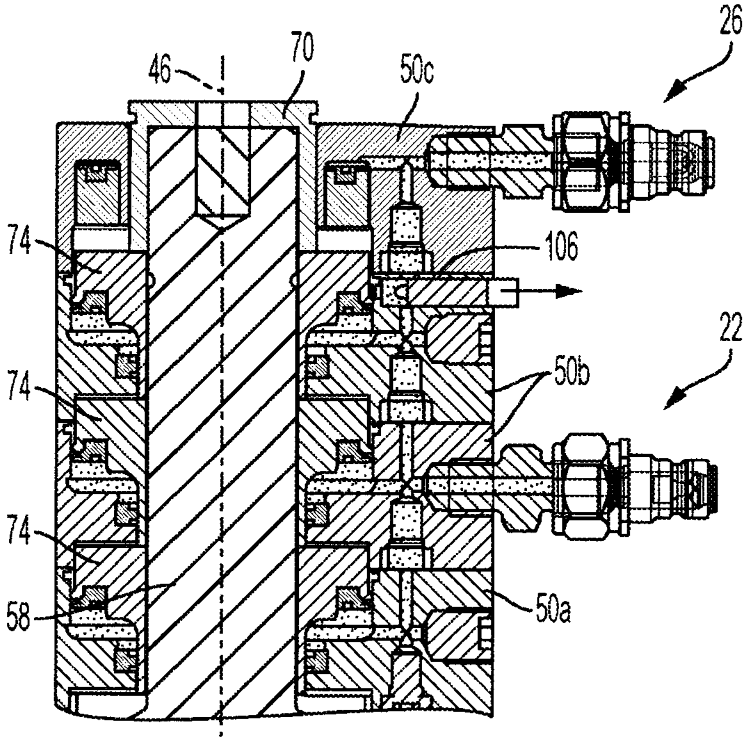
Figure 9C:
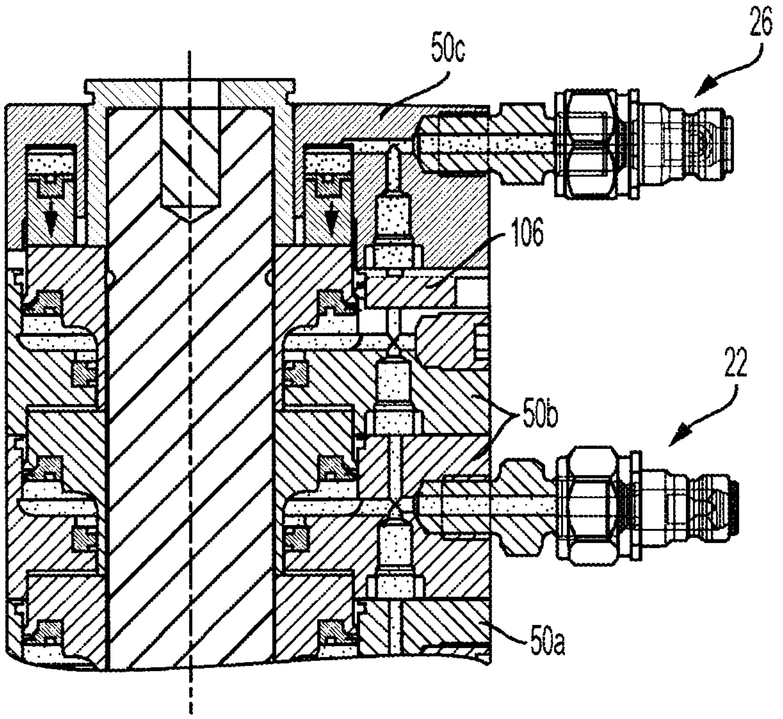
Figure 9D:
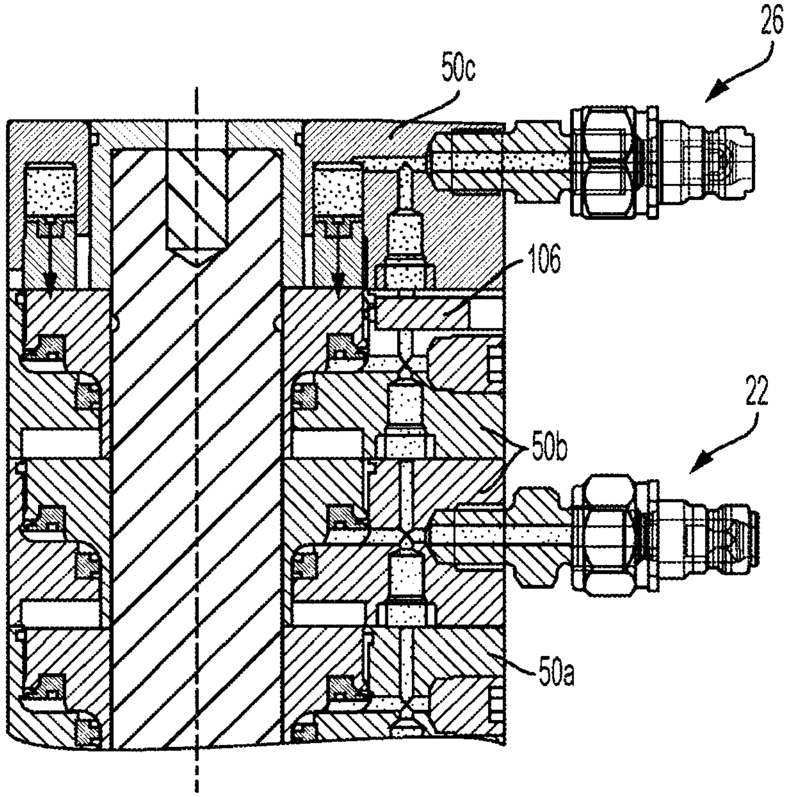

In addition, the tensioner 10 utilizes the pressurized fluid in the tensioning modules 50 to assist in returning the pistons 74 to their initial positions. Prior to applying pressurized fluid to the tensioning modules 50, the pistons 74 are located in an original position. For example, FIG. 9A illustrates an initial stage of the tensioning operation in which pressurized fluid is applied to lower surfaces 86 of the pistons 74 in each tensioning module 50. Simultaneously, a low pressure is applied to the outlet coupling 26 to assist an advancing the rod upward as viewed in FIG. 9A. As illustrated in FIG. 9B, during and/or after advancing the rod 58 upward as viewed in FIG. 9A, the relief valve 106 is activated to release the low pressure applied from the outlet coupling 26 to the exterior of the tensioner 10. With the rod 58 and pistons 74 advanced, pressure is adequately applied and the piston 74 is moved to a tensioning position. After the tensioning pressure is reached and the nut is tightened to retain the force, the tensioning pressure is released. FIG. 9C illustrates the beginning of a retract cycle in which a retracting pressure can be applied to port 26 to return the pistons 74 to their original position. FIG. 9D illustrates the completion of the retract cycle with the pistons 74 in the original position. Notably, a top surface of the cap 70 is aligned with a top surface of the cap module 50*c* in the original position and upon completion of the retract cycle.

The relief valve 106 can also be actuated if the pressure in the tensioner 10 exceeds a predetermined maximum pressure. The relief valve 106 may be set to open once a predetermined pressure is reached or if the tensioner reaches maximum stroke, thereby providing a closed path for the fluid to be diverted back to a tank. Unlike conventional tensioners in which over-pressurization typically causes fluid to leak past seals, the tensioner 10 provides a self-contained system and reduces potential harm to an operator and contamination of the environment.

Figure 10:
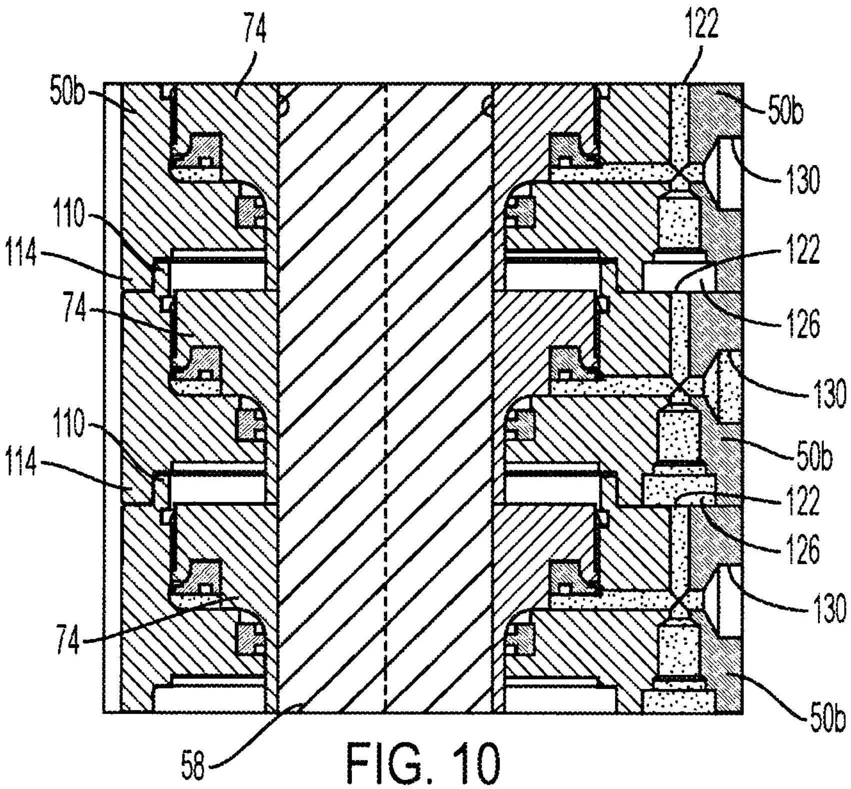
FIG. 10 is a section view of a portion of a hydraulic tensioner according to another embodiment.
Figure 11:
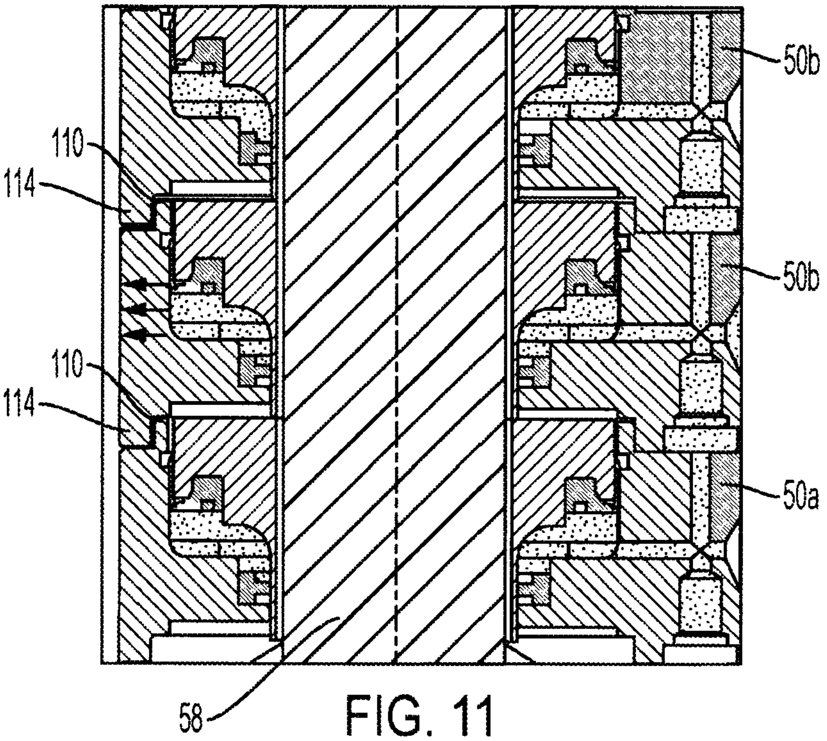
FIG. 11 is a section view of a portion of the hydraulic tensioner of FIG. 10.

As shown in FIGS. 10 and 11, each tensioning module 50 includes an outer wall forming a stepped interface with an adjacent tensioning module 50. In the illustrated embodiment, an upper portion of one of the tensioning modules 50 includes a protruding inner wall 110, and a lower portion includes a protruding outer flange or wall 114. The inner wall 110 of one tensioning module 50 is received within a recess formed by the outer flange 114 on the lower surface 86 of an adjacent tensioning module 50. When the tensioning modules 50 are pressurized, the fluid can exert a radial load in a direction perpendicular to the tensioning axis 46 and can cause deflection of outer walls of the modules. The stepped engagement between adjacent tensioning modules 50 retains and controls the deflection.

Furthermore, referring again to FIG. 10, the fluid connections between each tensioning module 50 are incorporated into the housing of the modules 50. For example, the upper surface of each tensioning module 50 includes a port 122 that is aligned with a corresponding port 126 on a lower surface of an adjacently-positioned tensioning module 50. Each tensioning module 50 also includes a radial port 130 that is capable of being coupled to a fluid supply or return coupling. Accordingly, the tensioner 10 provides an integrated manifold that is incorporated into the tensioning modules 50. The integration of the fluid connections into the tensioning modules 50 reduces the need for separate couplings, simplifying assembly and limiting the number of potential leak points.

Figure 12:
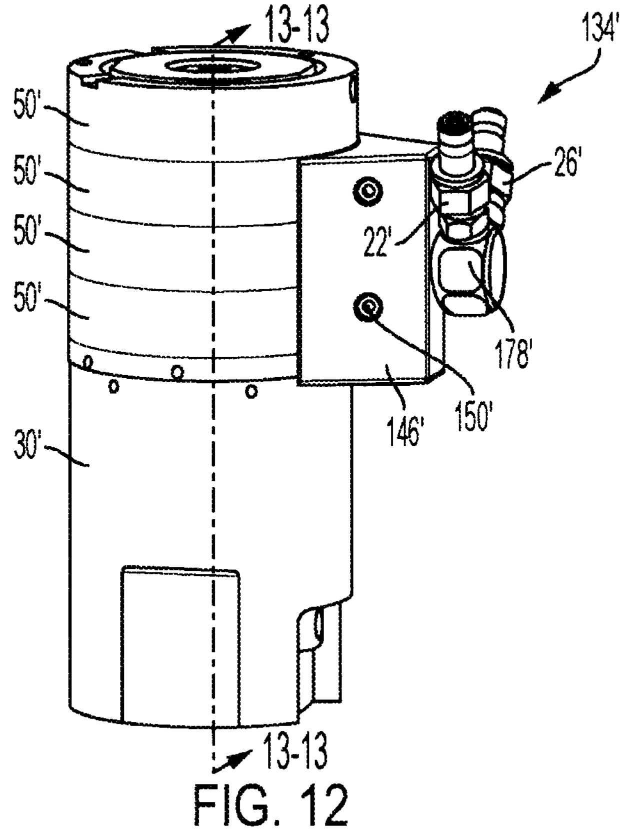
FIG. 12 is a perspective view of a hydraulic tensioner according to another embodiment.
Figure 13:
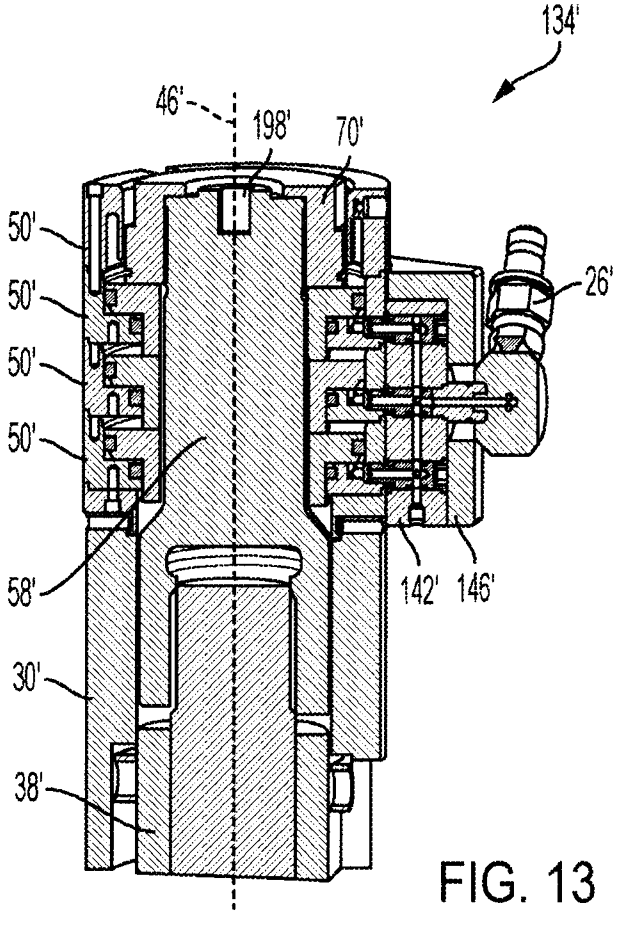
FIG. 13 is a section view of the hydraulic tensioner of FIG. 12, viewed along section 13-13.
Figure 14:
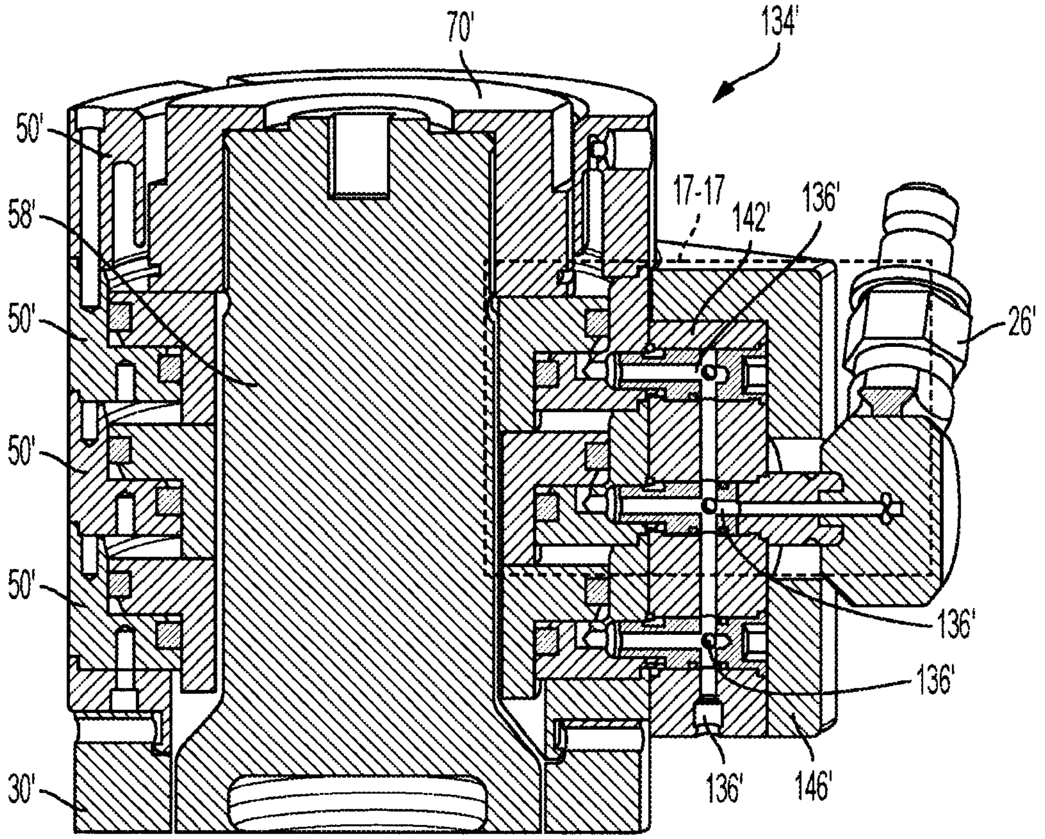
FIG. 14 is a section view of a hydraulic tensioner according to another embodiment.
Figure 15:
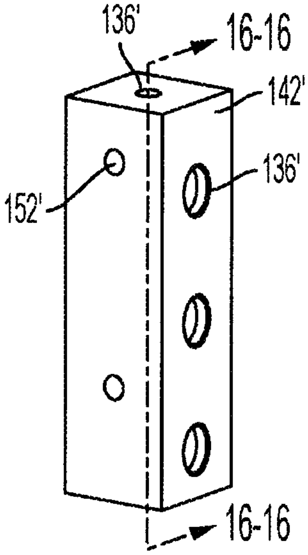
FIG. 15 is a perspective view of a manifold of the hydraulic tensioner of FIG. 14.
Figure 16:
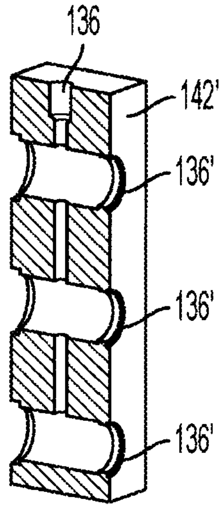
FIG. 16 is a section view of the manifold of FIG. 15, viewed along section 16-16.
Figure 17:
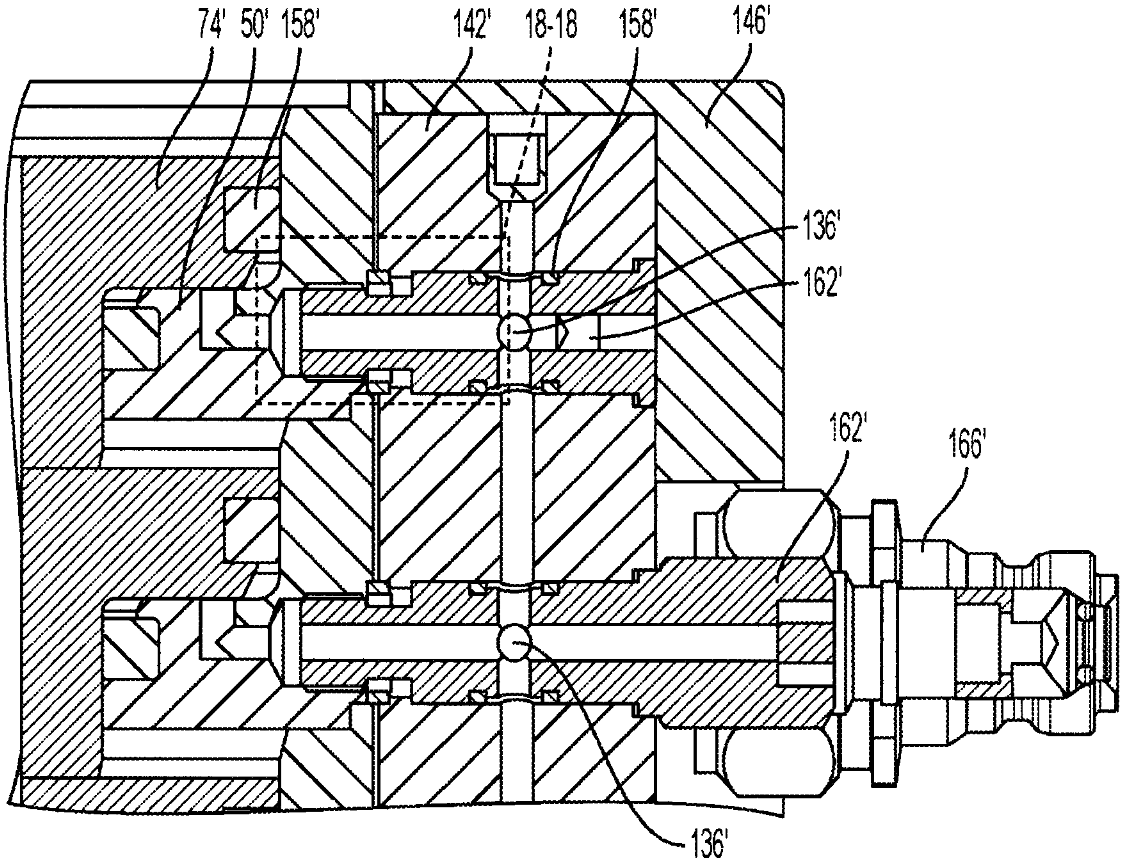
FIG. 17 is an enlarged section view of area 17-17 of the hydraulic tensioner of FIG. 14.
Figure 18:
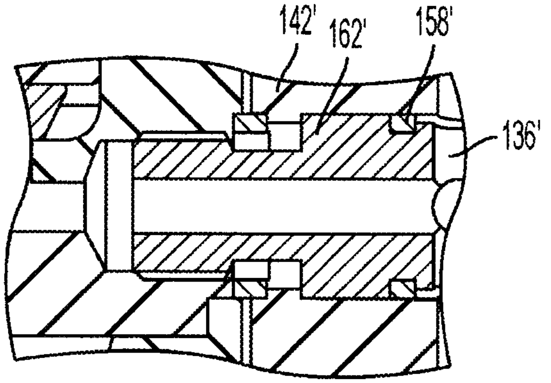
FIG. 18 is an enlarged section view of area 18-18 of the hydraulic tensioner of FIG. 17.

FIGS. 12-13 illustrate a tensioner device 134' according to another embodiment. Some similarities and differences between the tensioner device 134' and the tensioner device 10 are described, and similar features are designated with similar reference numbers appended with '.

The tensioner device 134' has many of the same components as the tensioner 10. For example, the tensioner device 134' includes multiple tensioning modules 50' in a stacked configuration similar to the tensioner 10. However, in the tensioner device 134', the tensioning modules 50' have an outer cylindrical wall and an annular inner aperture to receive the rod 58'. The tensioner device 134' includes a manifold 142' having one or more ports or holes 136' (FIG. 4) operable to fluidly communicate with an inlet coupling 22' and an outlet coupling 26' that is external to the cylindrical tensioning modules 134'. A shroud 146' may enclose the manifold 142' and the tensioning modules 50'. In some embodiments, additional components may be housed between the shroud 146' and the manifold 142'. Such components may be, but are not limited to printed circuit boards, circuitry, controllers, communication devices, or other devices operable to communicate with and/or control operation of the alternate tensioner device 134'.

Figure 22:
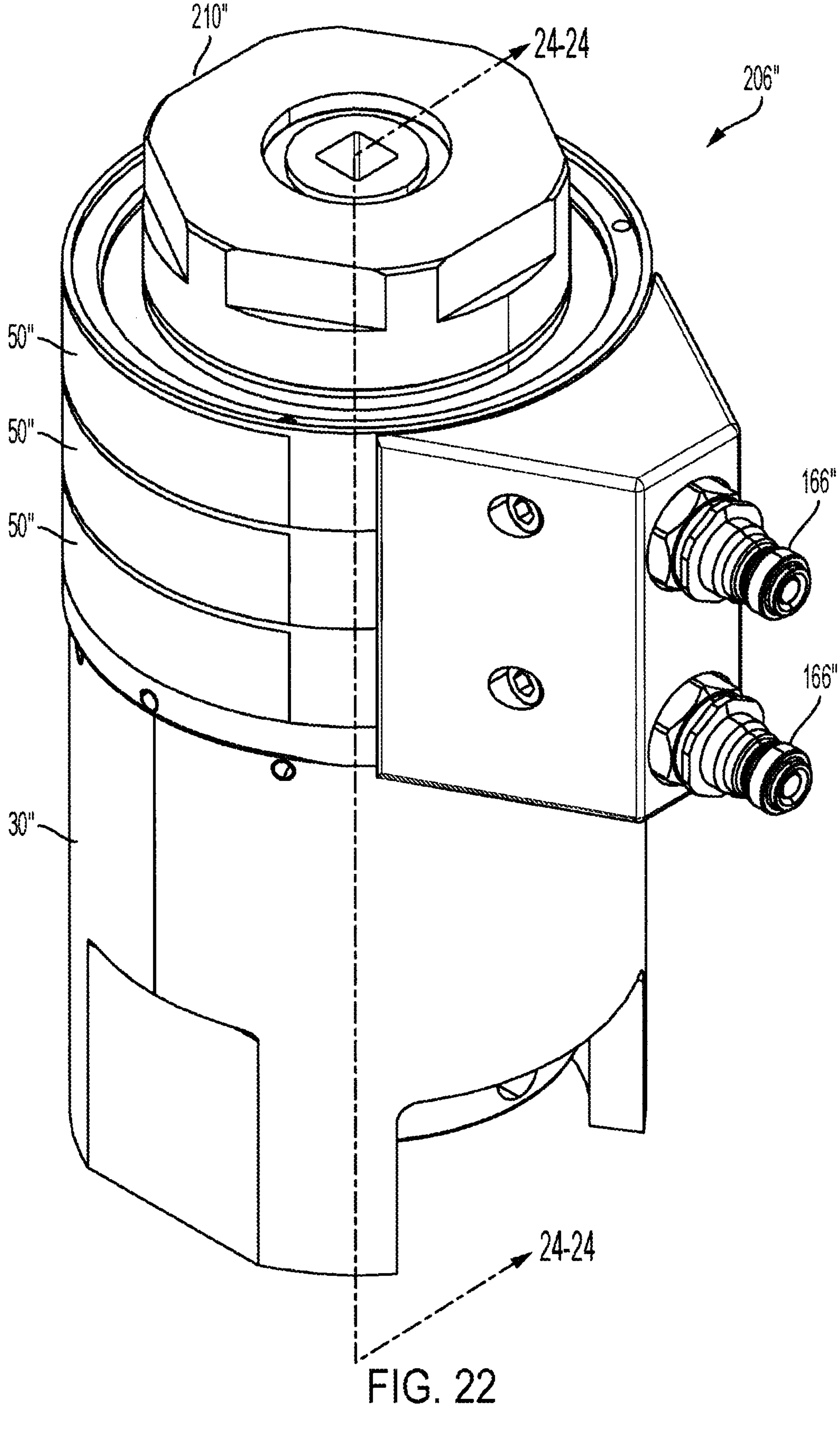
FIG. 22 is a perspective view of a hydraulic tensioner according to another embodiment.
Figure 23:
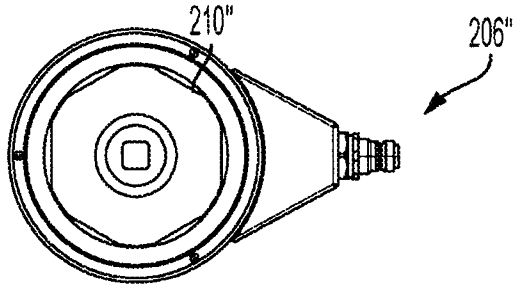
FIG. 23 is a top view of the hydraulic tensioner of FIG. 22.
Figure 24:
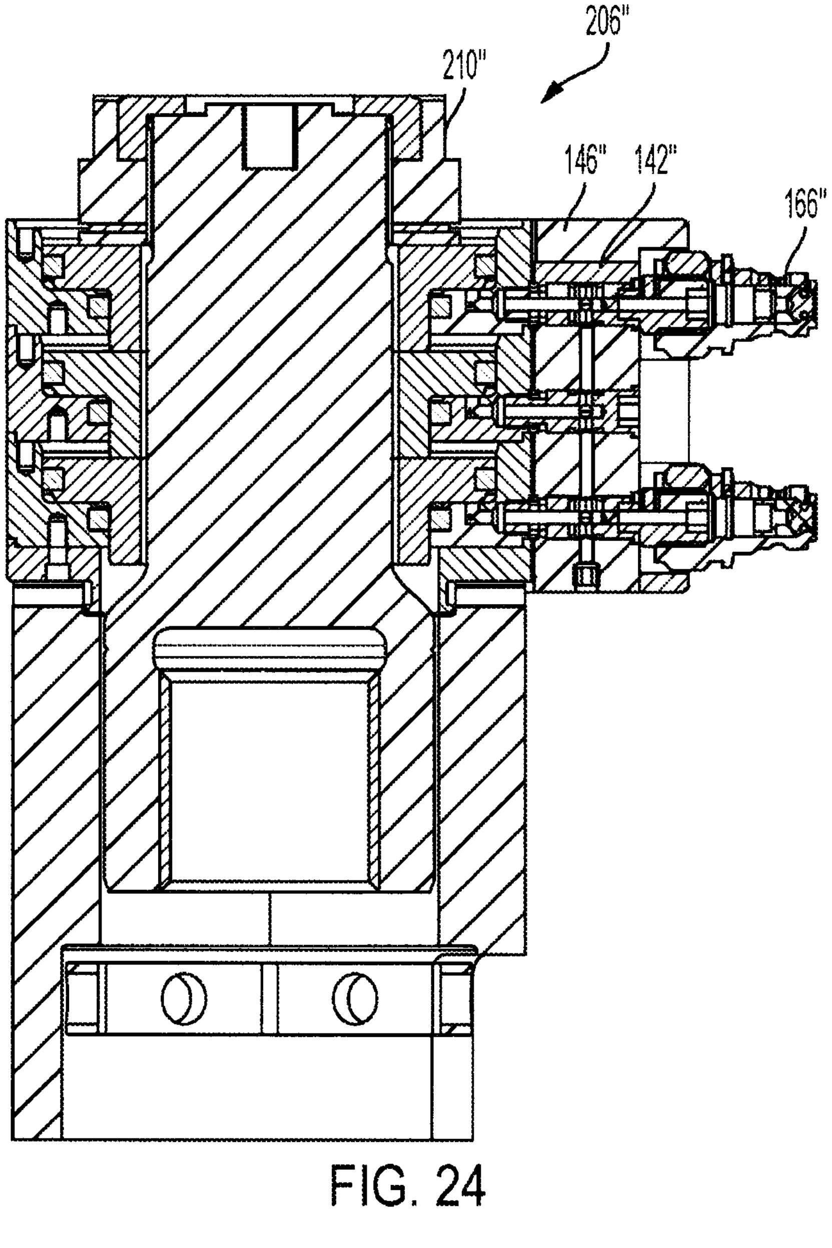
FIG. 24 is a section view of the hydraulic tensioner of FIG. 22, viewed along section 24-24.

FIGS. 22-24 illustrate another tensioner device 206" also having a manifold 142" and a shroud 146". The tensioner device 206" has three tensioning modules 50" and a cap 70". The cap 70" of the tensioner device 206" includes faces 210" which are polygonal, and more specifically, hexagonal as viewed from the top of the tensioner device 206" (FIG. 23). Torque may be applied to the faces 210" to rotate the cap 70" into or out of engagement from the rod 58". Some similarities and differences between the tensioner device 206" and the tensioner device 10 are described, and similar features are designated with similar reference numbers, appended with ".

FIGS. 14-18 illustrate the manifold 142' and surrounding components in detail. The drive pistons 90' of the modules 50' are in fluid communication with an external fluid source through the manifold 142'. Fasteners 150' engage holes 152' in the manifold 142' to retain the shroud 146' relative to the manifold 142'. In the illustrated embodiment, a plurality of fittings 162' extend through the manifold 142' and threadably engage the modules 50'. Seals 158' are supported on each fitting 162' and inhibit leakage of pressurized fluid from the manifold 142'. The seals 158' may be steel bonded seals, banjo seals, elastic o-rings, or the like. In the illustrated embodiment, the fittings 162' are banjo fittings. For example, the banjo bolts 162' may be M8 male banjo bolts. One of the bolts 162' may be an M8×¼ NPT male banjo bolt. At least one of the bolts 162' is configured to engage a coupling 166' (e.g., a CEJN 117 or other coupling) to permit fluid communication through the coupling 166' and the bolt 162' and into the manifold 142'. The coupling 166' may extend through the shroud 146' when the shroud 146' is positioned over the manifold 142', and the coupling 166' is accessible independent of the shroud 146' connection to the manifold 142'. The bolts 162' include holes 170' configured to permit pressurized fluid to pass from the manifold 142' to the tensioner 134'. Inlet pressure is applied via the coupling 166'.

The fluid inlet and outlet couplings may be configured in various ways. For example, a return line of one tensioner 134' may be placed in fluid communication with an input connection of another tensioner 134'. An output connection for connecting to yet another tensioner 134' may be configured. As such, multiple tensioners 134' can be chained together with a single input coupling 22' and a single outlet coupling 26'.

Figure 19:
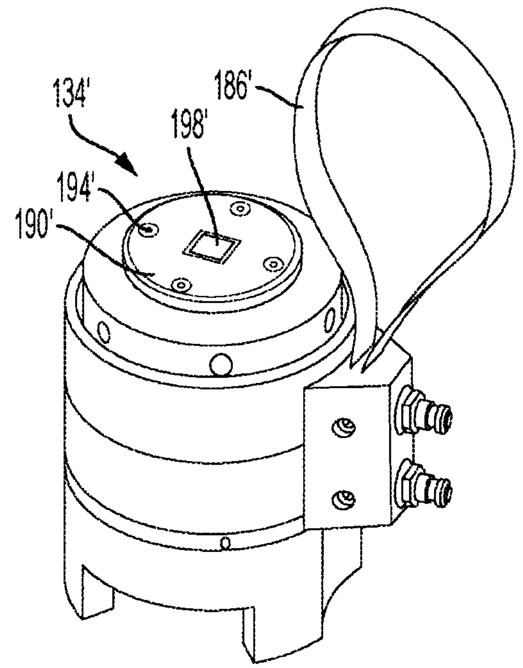
FIG. 19 is a perspective view of the hydraulic tensioner of FIG. 14 including a carrying strap.
Figure 20:
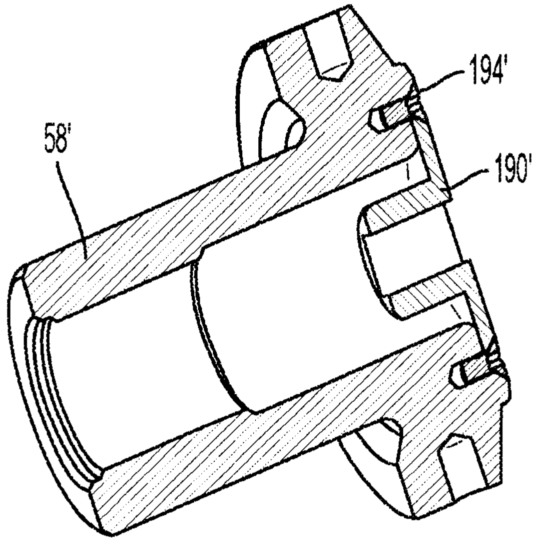
FIG. 20 is a section view of a rod of the hydraulic tensioner with a driver plate, viewed along section 20-20 of FIG. 21.
Figure 21:
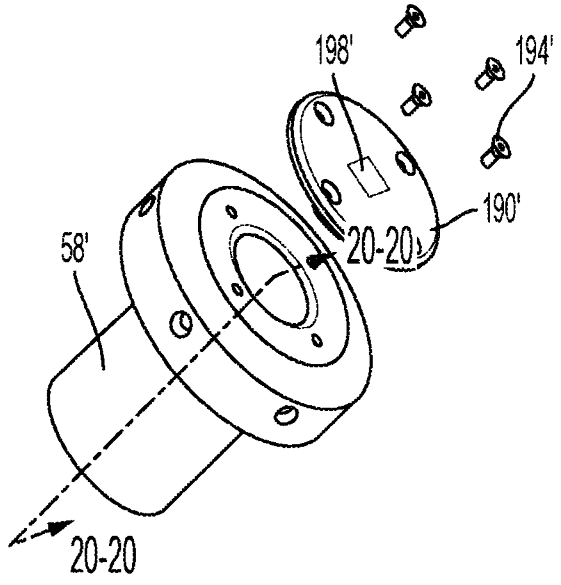
FIG. 21 is an exploded view of the rod and driver plate of FIG. 20.

In some embodiments, the tensioner 134' may be provided with a carrying strap 186' (FIG. 19). The carrying strap 186' may be coupled to the shroud 146'. The strap 186' may be used to carry the entire tensioner 134' including the shroud 146'. Furthermore, in some embodiments, an upper end of the rod 58' may be coupled to a drive plate 190' (FIGS. 20 and 21). Fasteners 194' removably couple the drive plate 190' to the rod 58'. The drive plate 190' includes a square drive 198' to rotate the rod 58'. The square drive 198' may receive torque from an external device to rotate the rod 58' when within the hydraulic tensioner 134'. Alternatively, the square drive 198' may be located directly in the rod 58', as shown in FIG. 13. The drive plate 190' may be removed from the rod 58' to permit access to the first end 62' of the rod 58'.

The tensioner 134' has a general profile similar in dimension to known tensioners. The tensioner 134' has approximately the same length along the tensioning axis 46', and approximately the same cylindrical diameter when compared to tensioners on the market.

FIGS. 25-36 illustrate an alternative construction of a hydraulic tensioner device 510. Some similarities and differences between the tensioner device 510 and the tensioner device 10 are described, and similar features are designated with similar reference numbers plus "500".

As shown in FIGS. 25-28, the tensioning device 510 includes a number of tensioning modules 550 (e.g., a base module 550*a* and three intermediate modules 550*b*) arranged in a stacked configuration with a retract module 550*c* stacked on top. As illustrated, the housing of the retract module 550*c* supports two retract port couplings 526*a*, 526*b*. The first retract port coupling 526*a* serves as an inlet to receive and apply pressurized fluid to the piston 574 of the uppermost tensioning module 550*b* to cause the pistons 574 to retract to the initial position. The second retract port coupling 526*b* is in communication with the first retract port coupling 526*a* and serves as an outlet from the tensioning device 510 to supply pressurized fluid from the tensioning device 510 (e.g., to a retract module of a downstream tensioning device 510A (see FIG. 38)).

Figure 27:
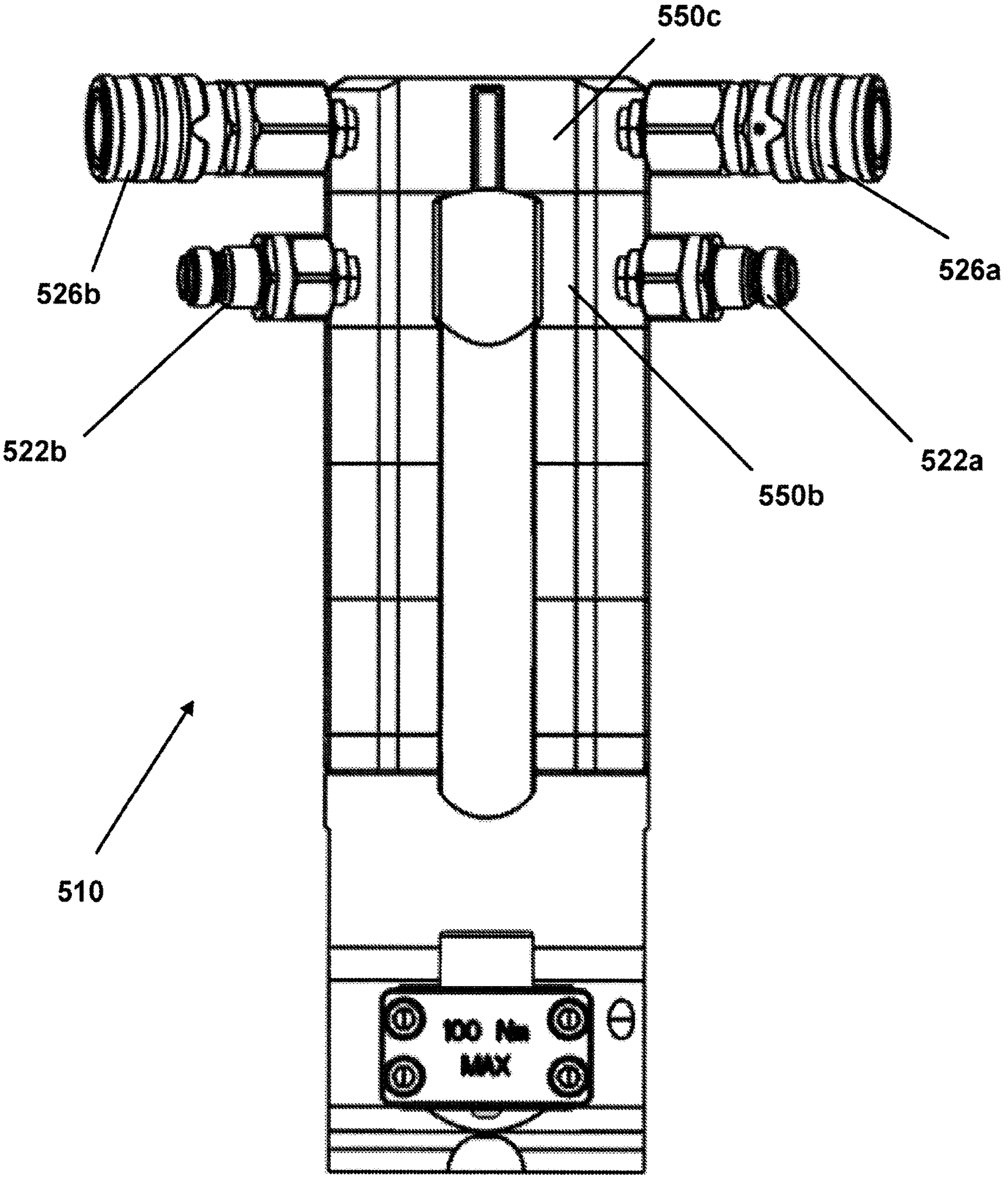
FIG. 27 is a front view of the hydraulic tensioner of FIG. 25.
Figure 28:
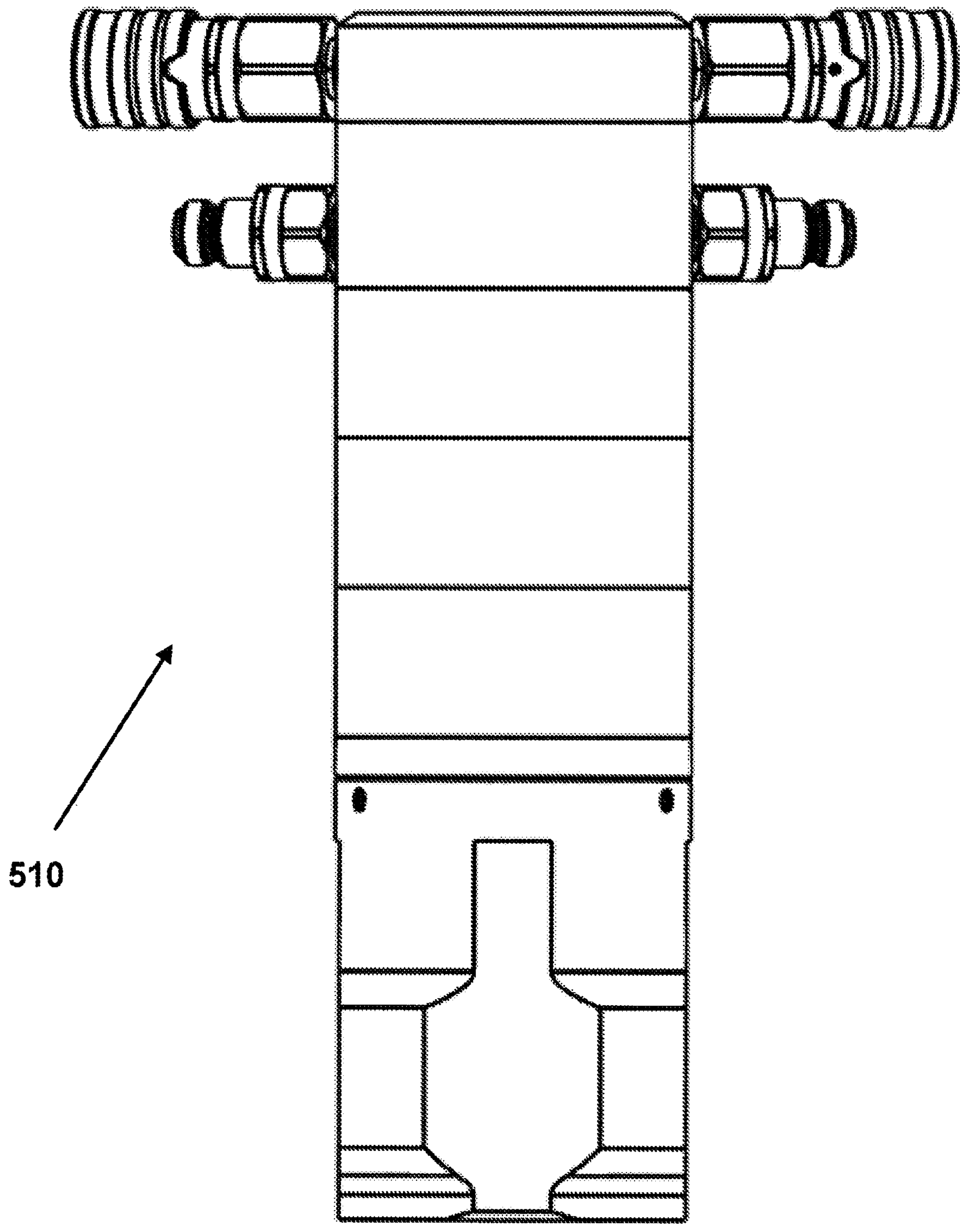
FIG. 28 is a rear view of the hydraulic tensioner of FIG. 25.
Figure 29:
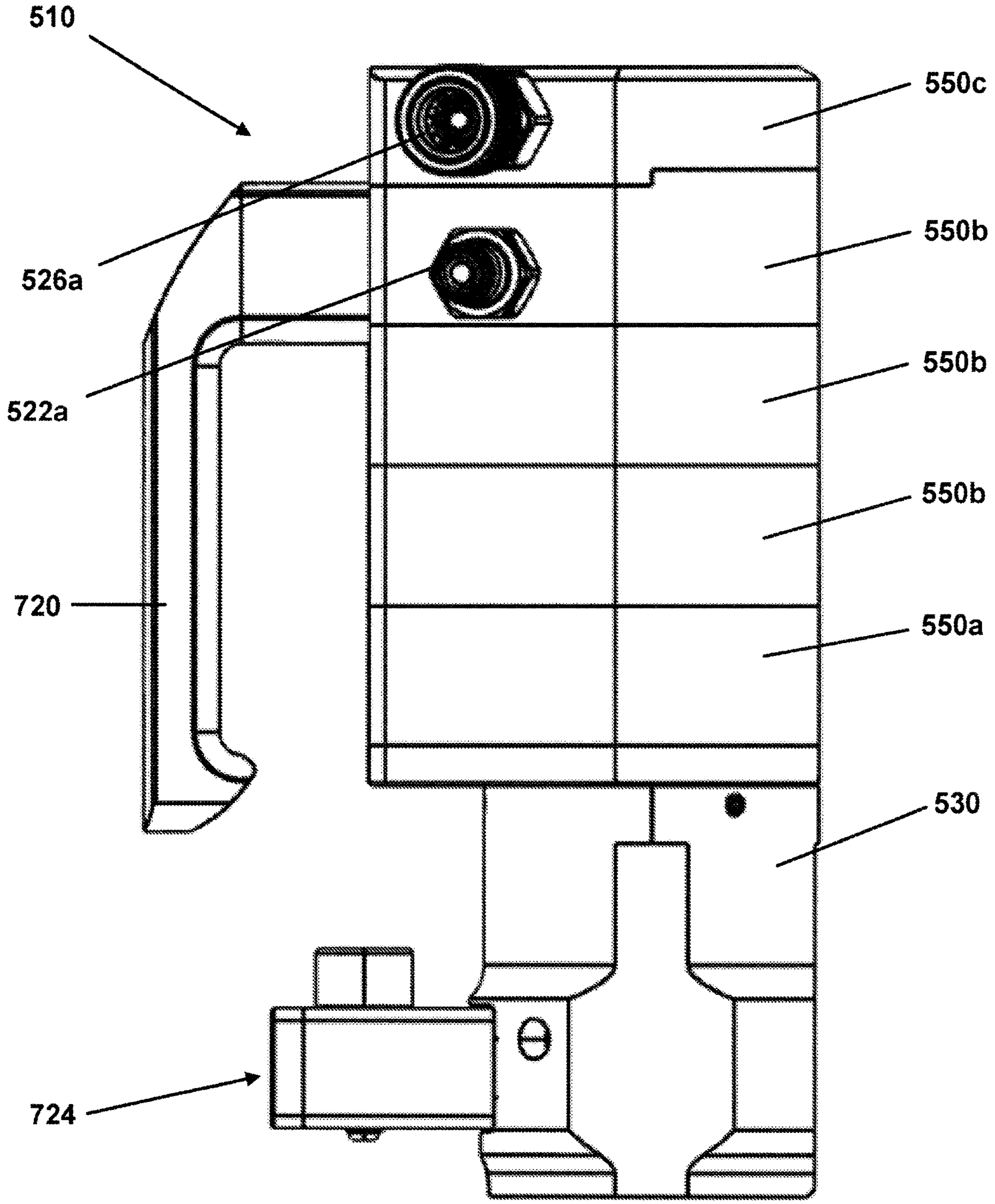
FIG. 29 is a side view of the hydraulic tensioner of FIG. 25.

Likewise, as illustrated, the tensioning module(s) 550*b* supports two tensioning port couplings 522*a*, 522*b*. As shown in FIG. 27, the housing of the uppermost tensioning module 550*b* defines the two tensioning port couplings 522*a*, 522*b*. The first tensioning port coupling 522*a* serves as an inlet to receive and apply pressurized fluid to the pistons 574 of the tensioning module(s) 550*a*, 550*b* to cause the pistons 574 to extend to the tensioning position. The second tensioning port coupling 522*b* is in communication with the first tensioning port 522*a* and serves as an outlet from tensioning device 510 to supply pressurized fluid from the tensioning device 510 (e.g., to a tensioning module of the downstream tensioning device 510A (see FIG. 38)).

Figure 37:
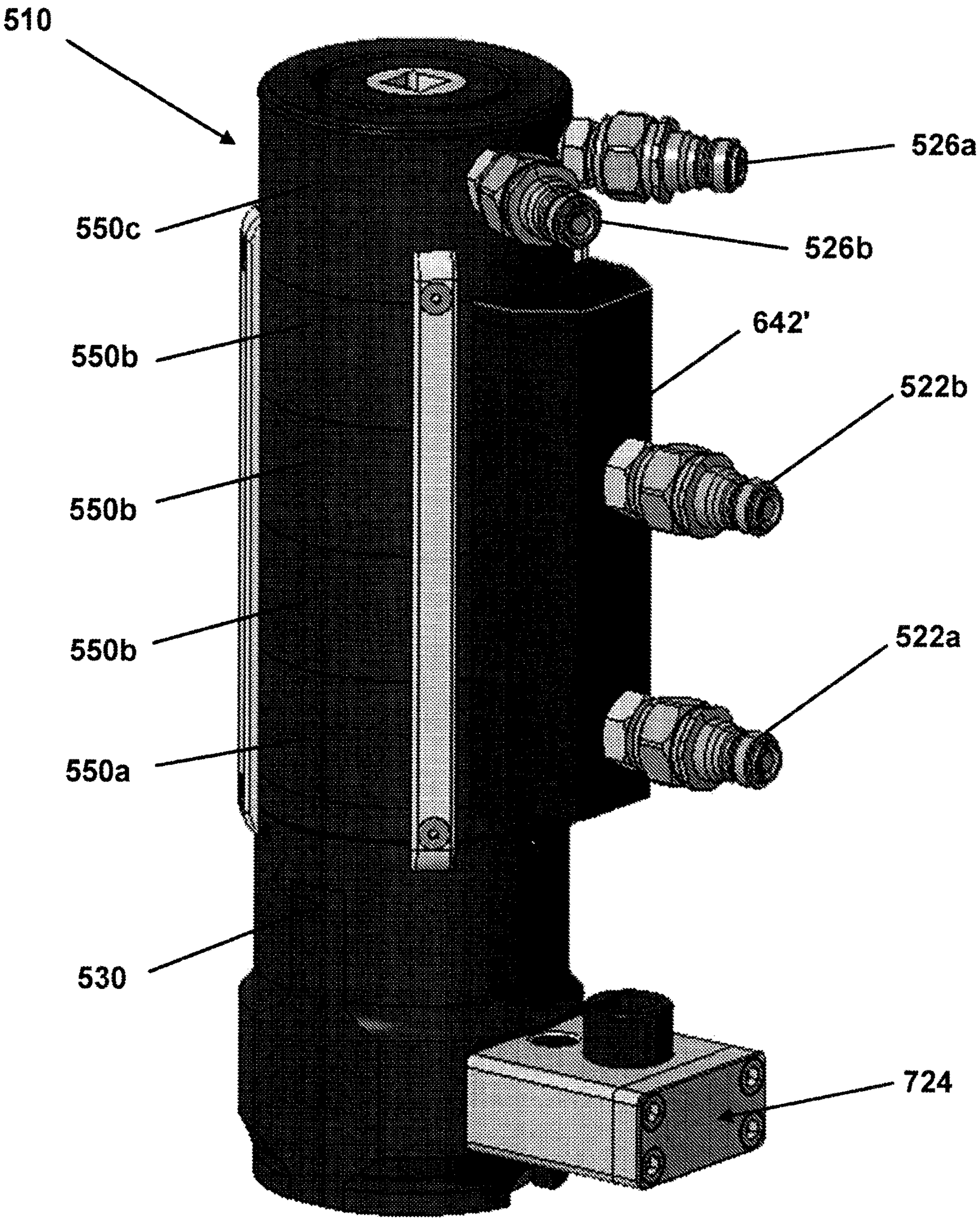
FIG. 37 is a perspective view of another alternative construction of a hydraulic tensioner.

In an alternative construction (see FIGS. 37-38), the two tensioning port couplings 522*a*, 522*b* are supported on a manifold 642'. One tensioning port coupling 522*a* communicates with the tensioning modules 550*a*, 550*b* of the tensioning device 510, and the other tensioning port coupling 522*b* communicates with the tensioning module(s) 550A of the downstream tensioning device 510A.

Figure 31:
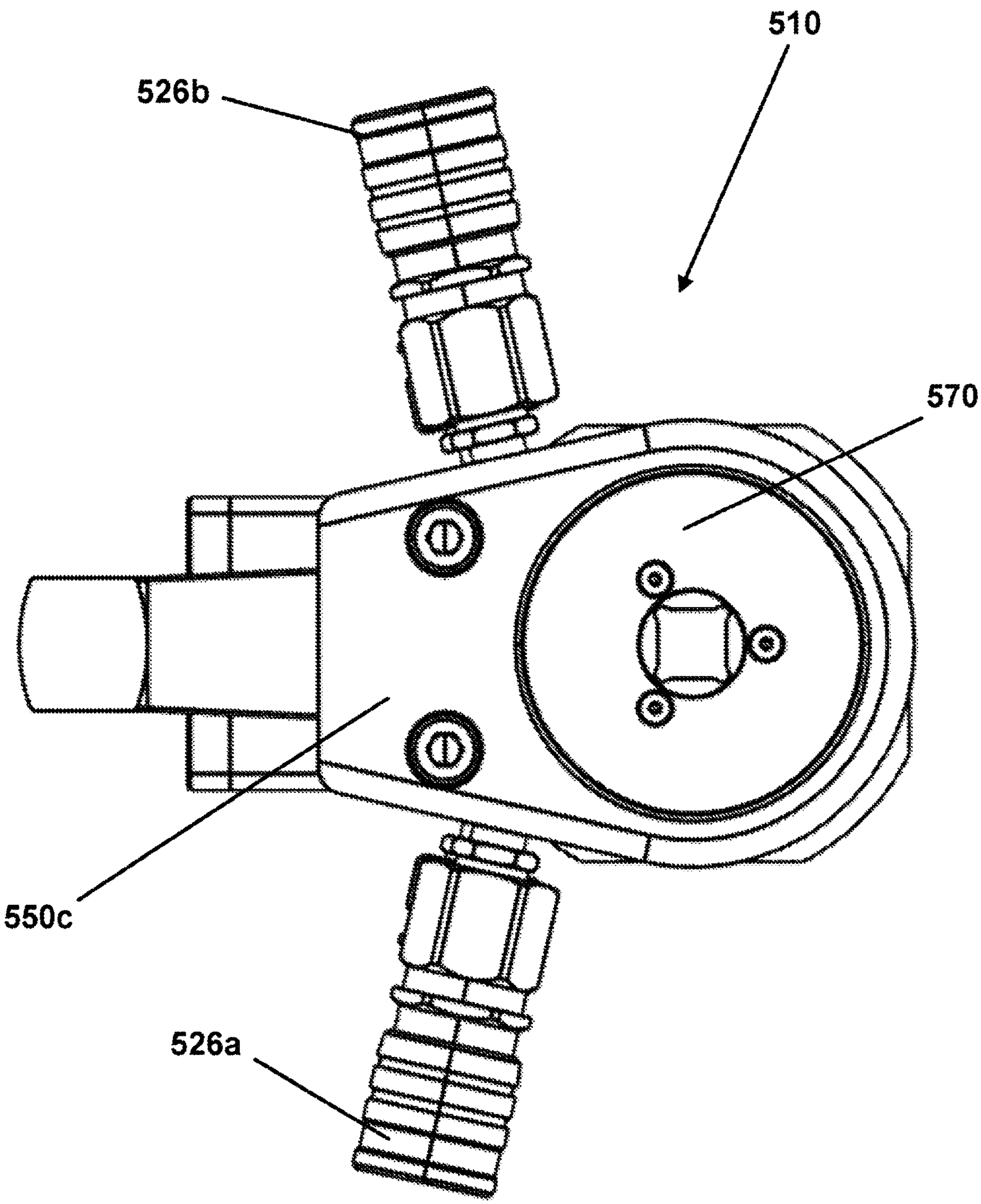
FIG. 31 is a top view of the hydraulic tensioner of FIG. 25.
Figure 32:
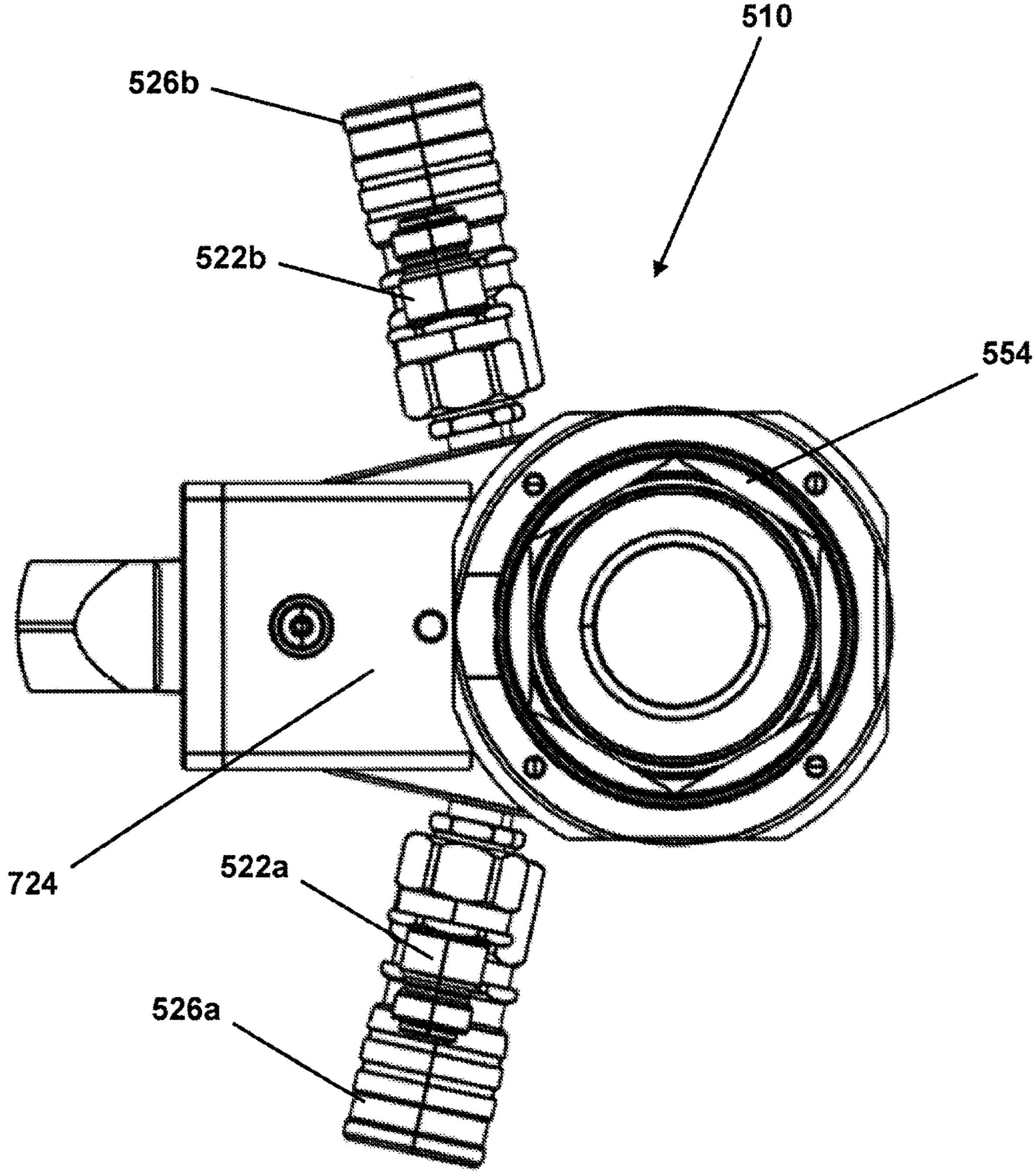
FIG. 32 is a bottom view of the hydraulic tensioner of FIG. 25.
Figure 33:
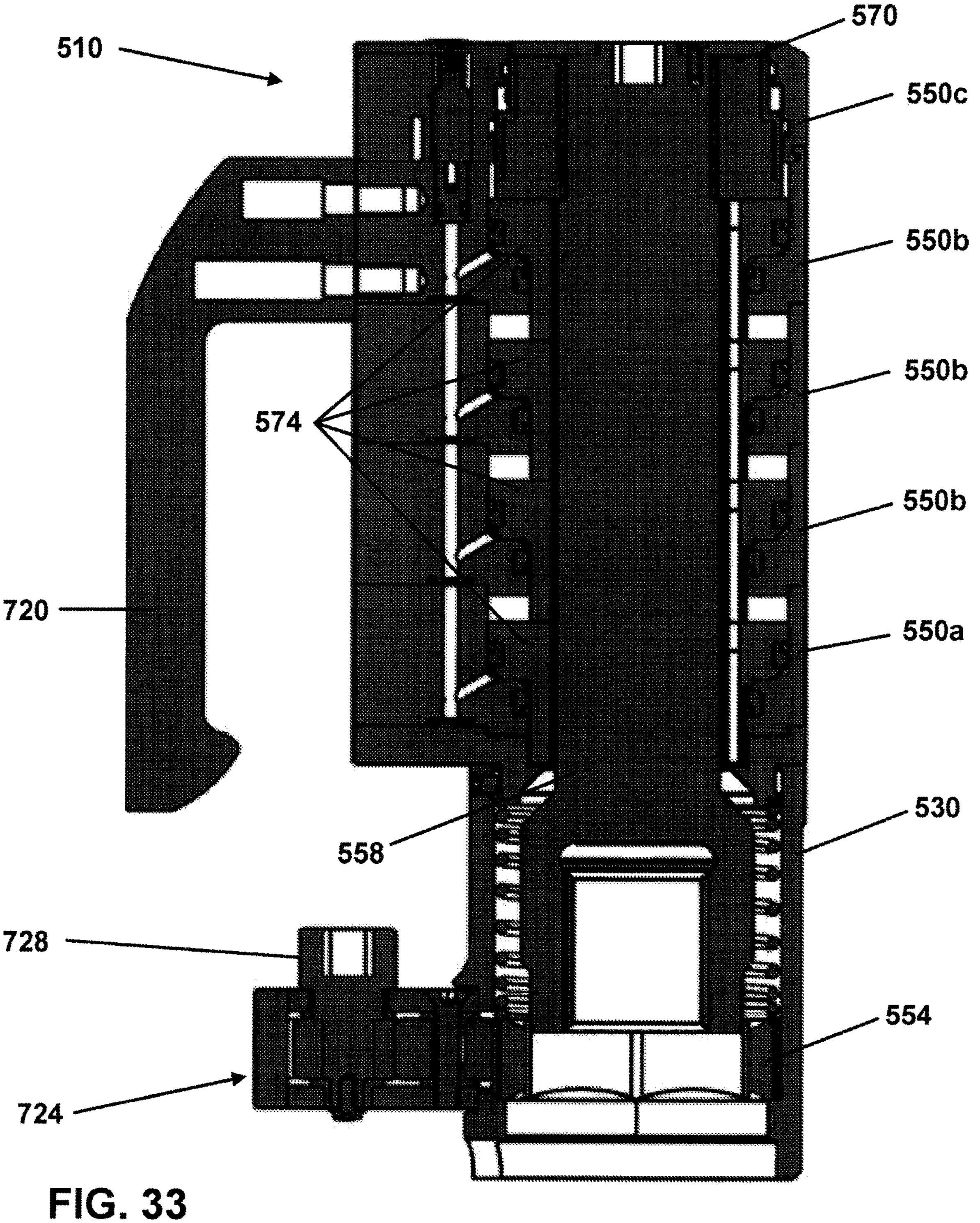
FIG. 33 is a section view of the hydraulic tensioner of FIG. 25, viewed along line 33-33 in FIG. 31.
Figure 34:
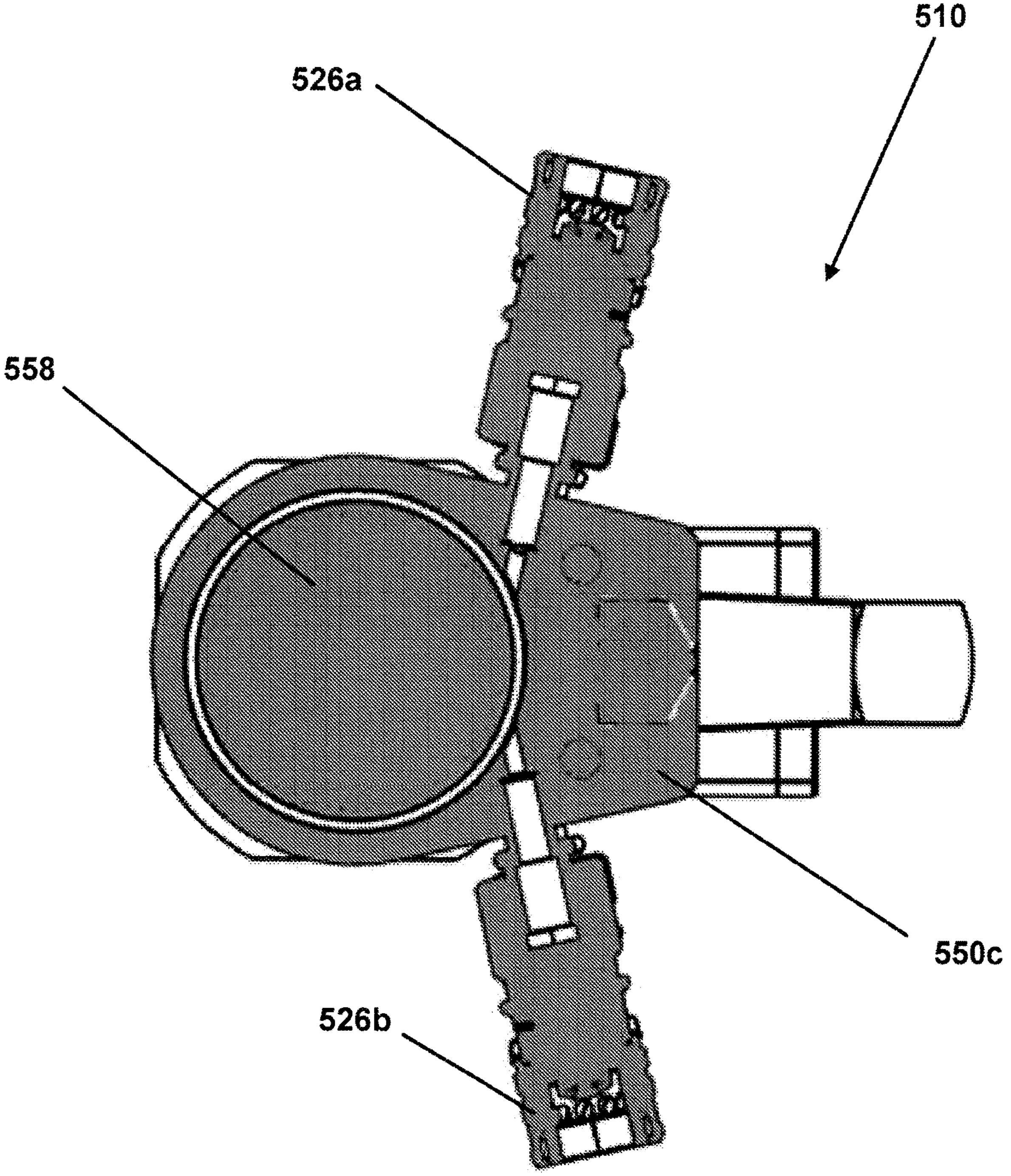
FIG. 34 is a section view of the hydraulic tensioner of FIG. 25, viewed along line 34-34 in FIG. 30.
Figure 35:
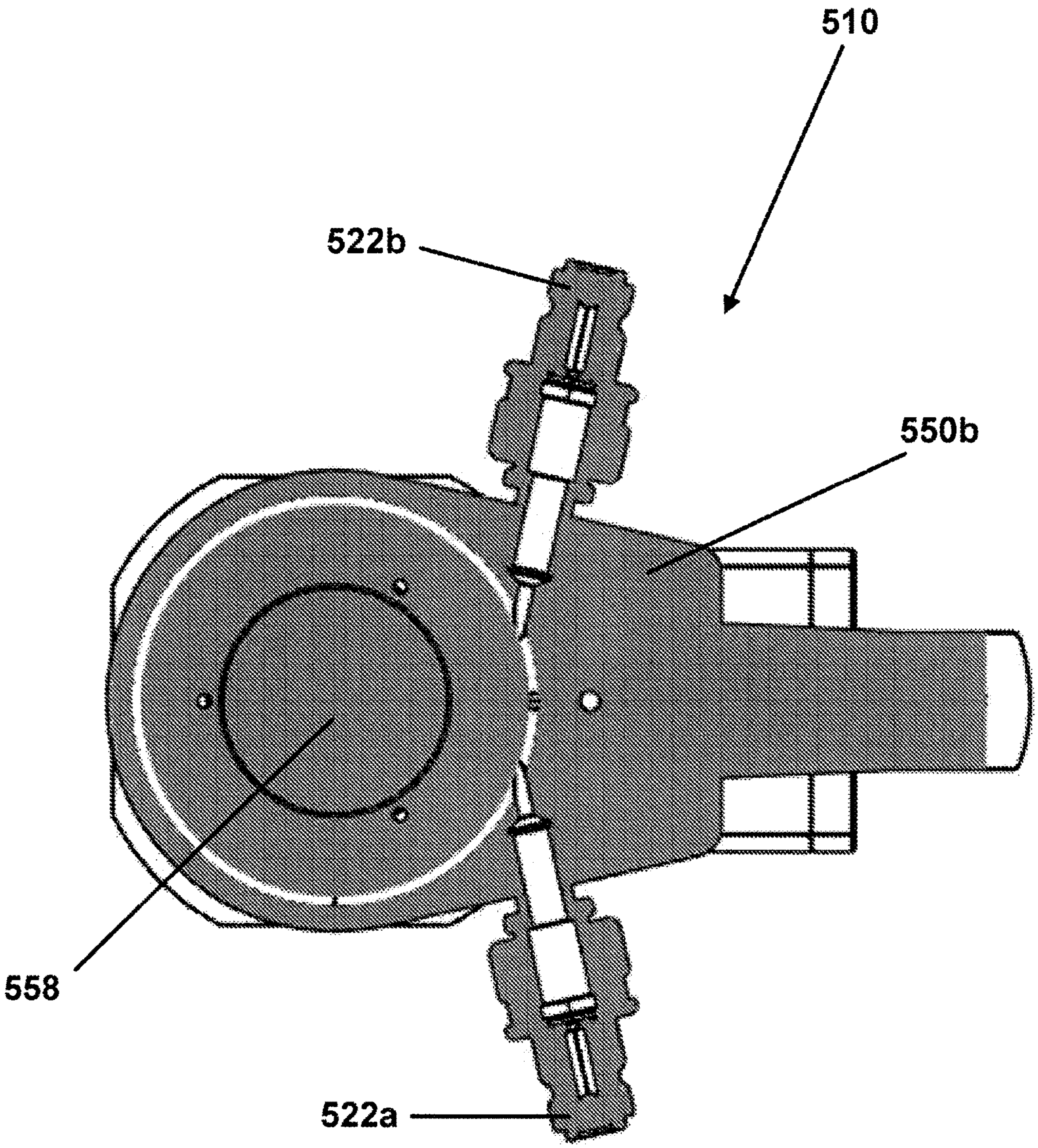
FIG. 35 is a section view of the hydraulic tensioner of FIG. 25, viewed along line 35-35 in FIG. 30.
Figure 36:
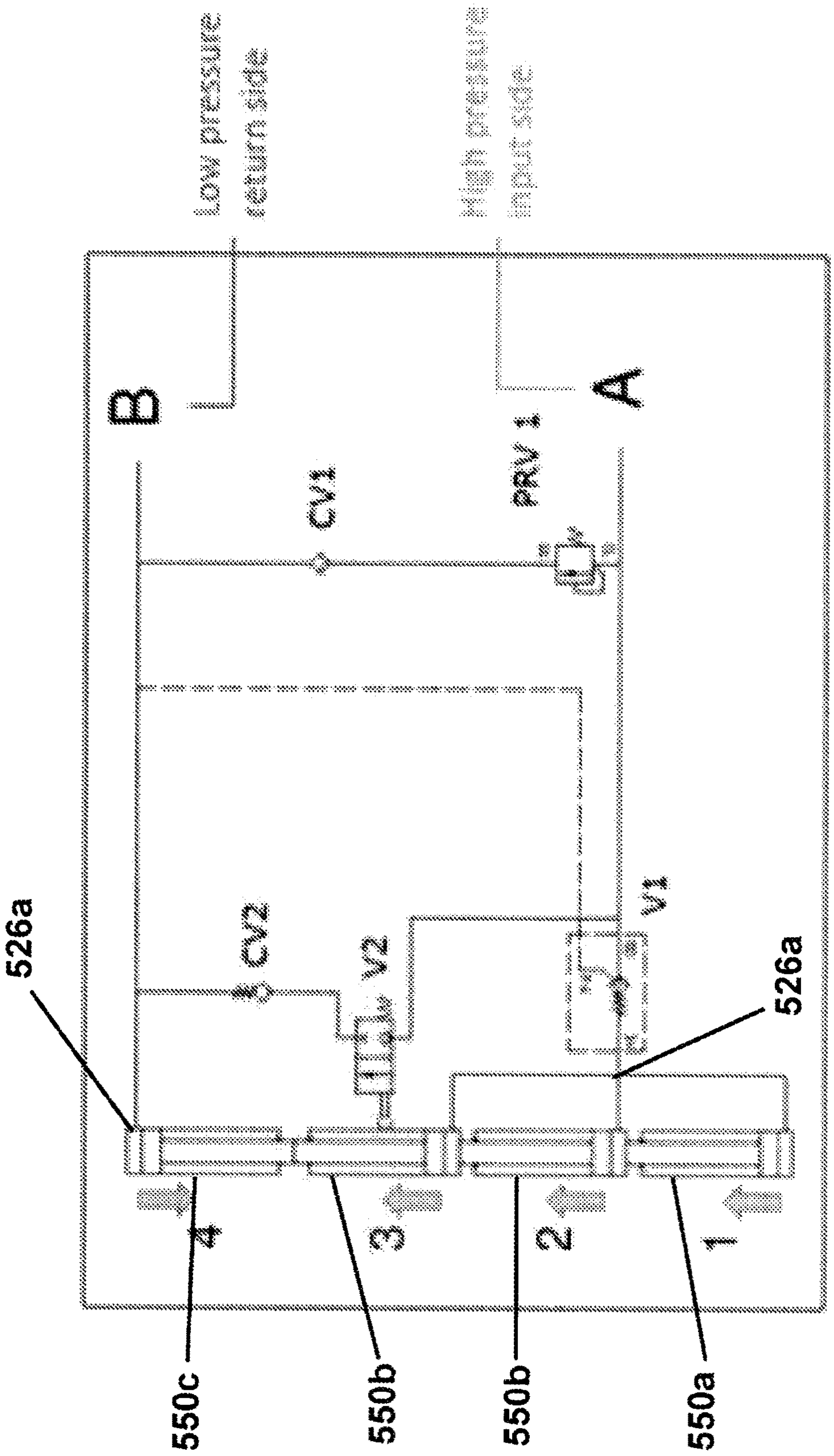
FIG. 36 is a schematic of a hydraulic circuit including the hydraulic tensioner of FIG. 25.

As shown in FIG. 31, the teardrop shape of the modules 550 provides a flat rear face on which a handle 720 may be mounted. The illustrated shape also facilitates the inclusion of integral oil passages in the modules 550 and the removal of a manifold.

Figure 25:
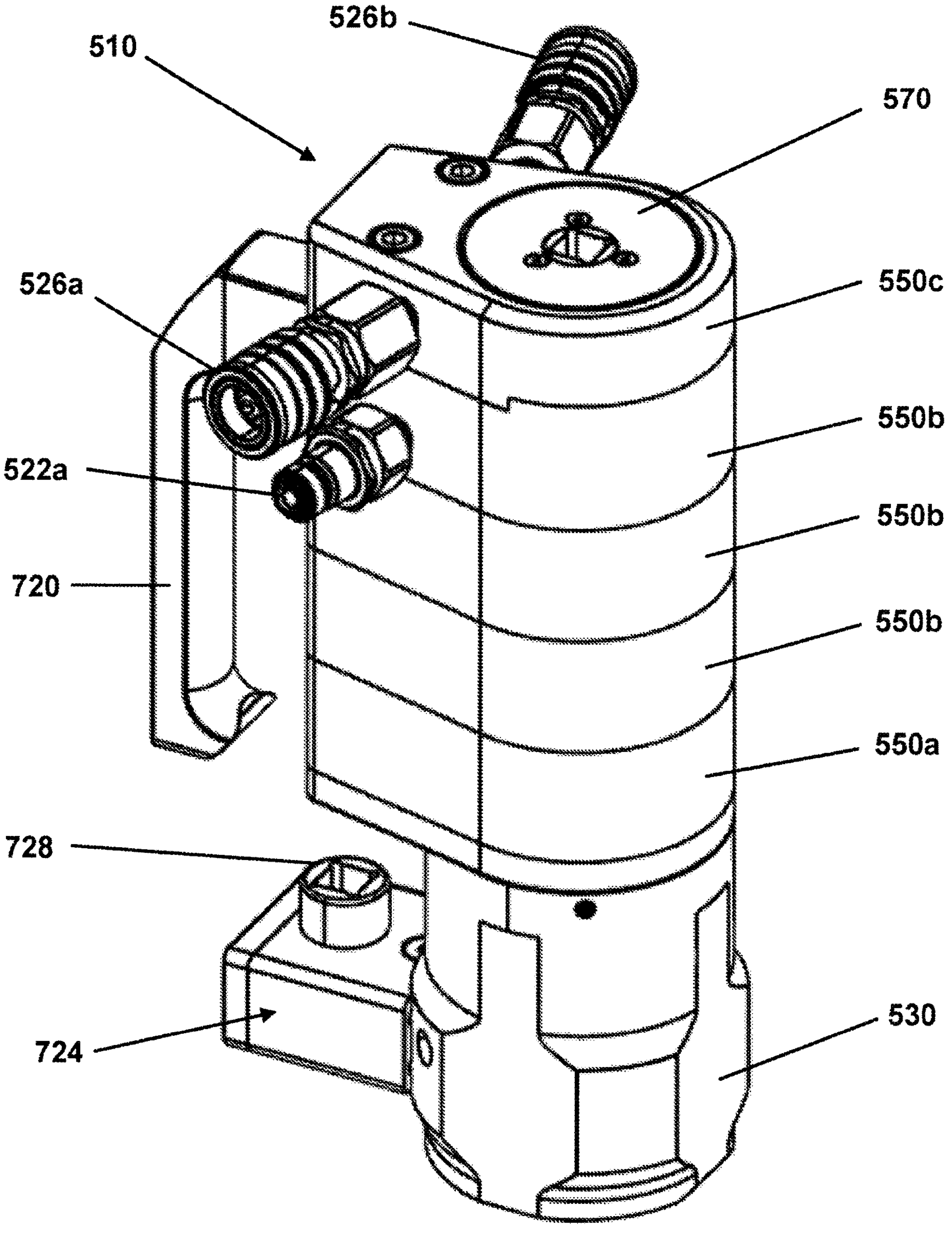
FIG. 25 is a perspective view of an alternative construction of a hydraulic tensioner.
Figure 26:
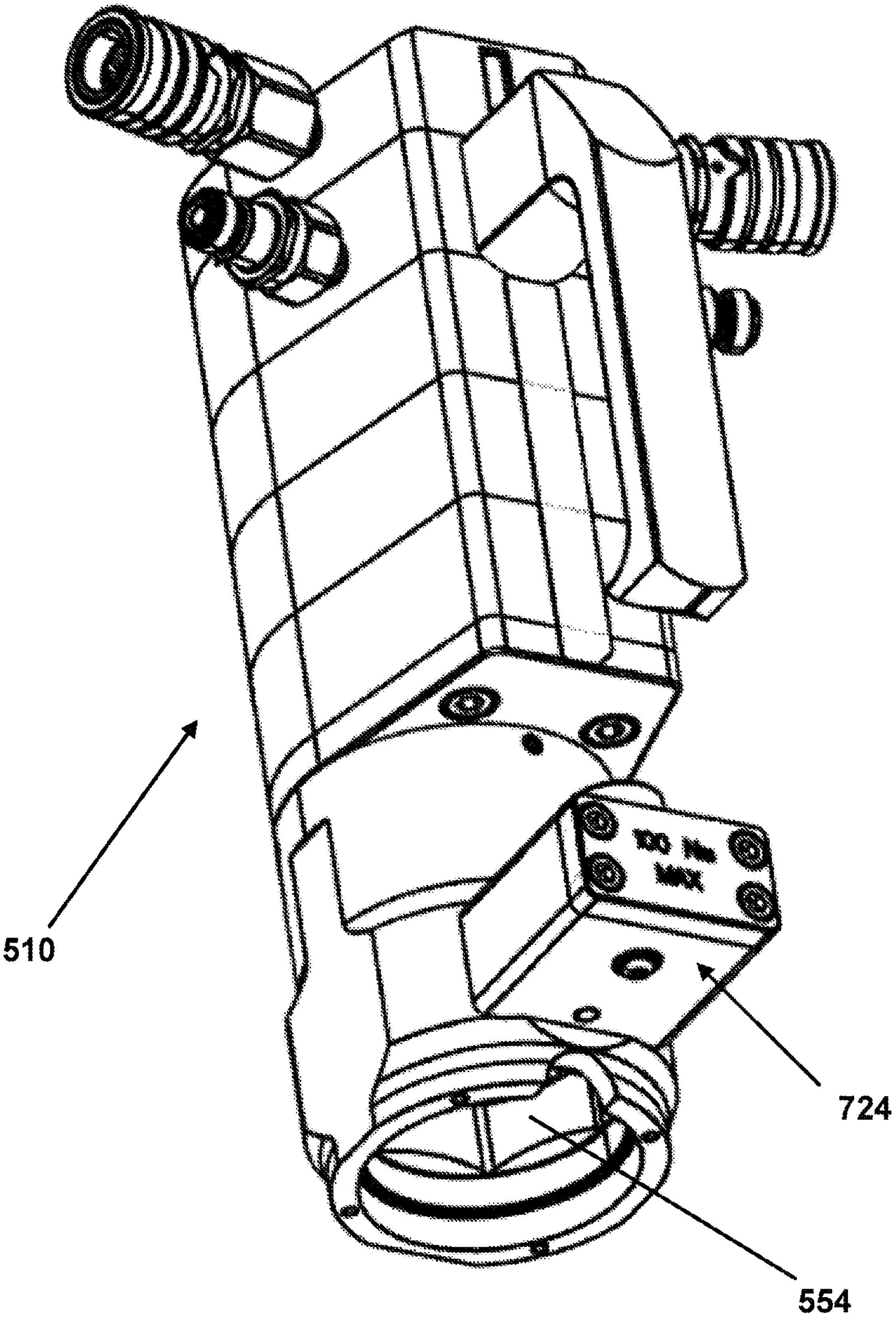
FIG. 26 is another perspective view of the hydraulic tensioner of FIG. 25.
Figure 30:
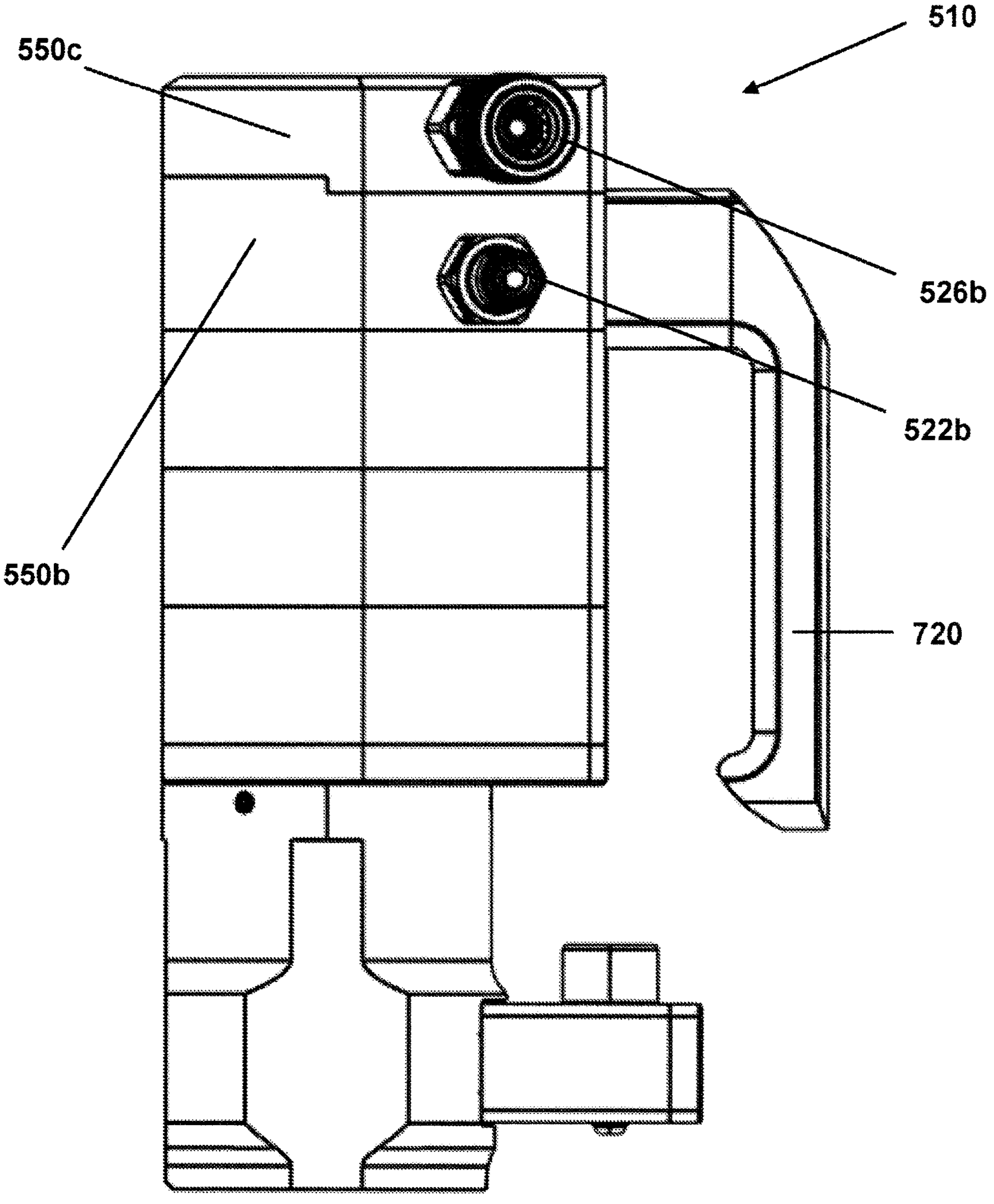
FIG. 30 is another view of the hydraulic tensioner of FIG. 25.

As shown in FIGS. 25 and 30, the tensioning device 510 includes a drive mechanism 724 operable to rotate the workpiece (e.g., a bolt, a nut, etc.) after tensioning. The drive mechanism 724 includes an interface 728 engageable by a tool (not shown), such as a wrench, to rotate the coupler 554 (see FIG. 30).

Figure 38:
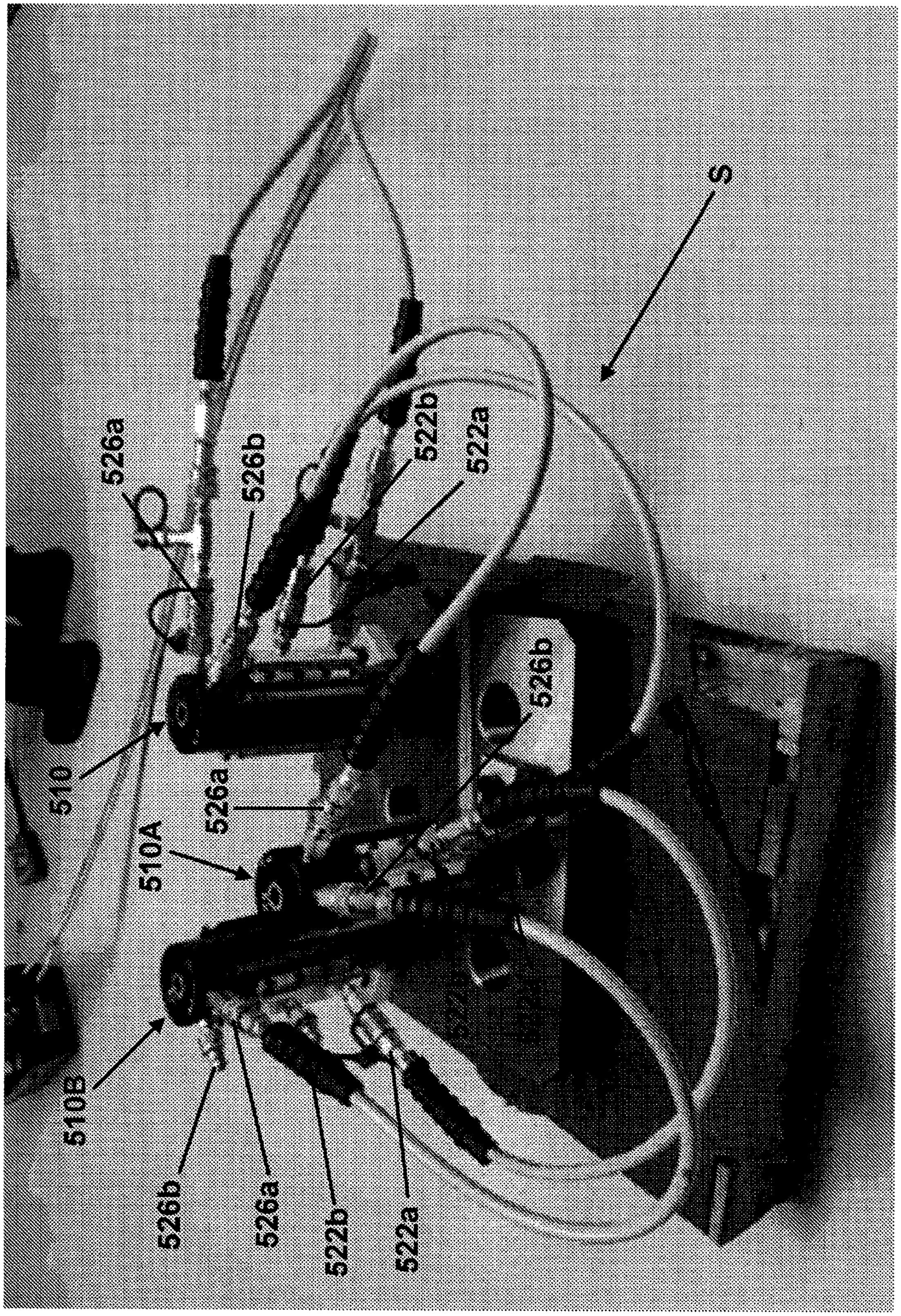
FIG. 38 is a photograph of a perspective view of a hydraulic tensioning system including multiple hydraulic tensioners as shown in FIG. 37.
Figure 39:
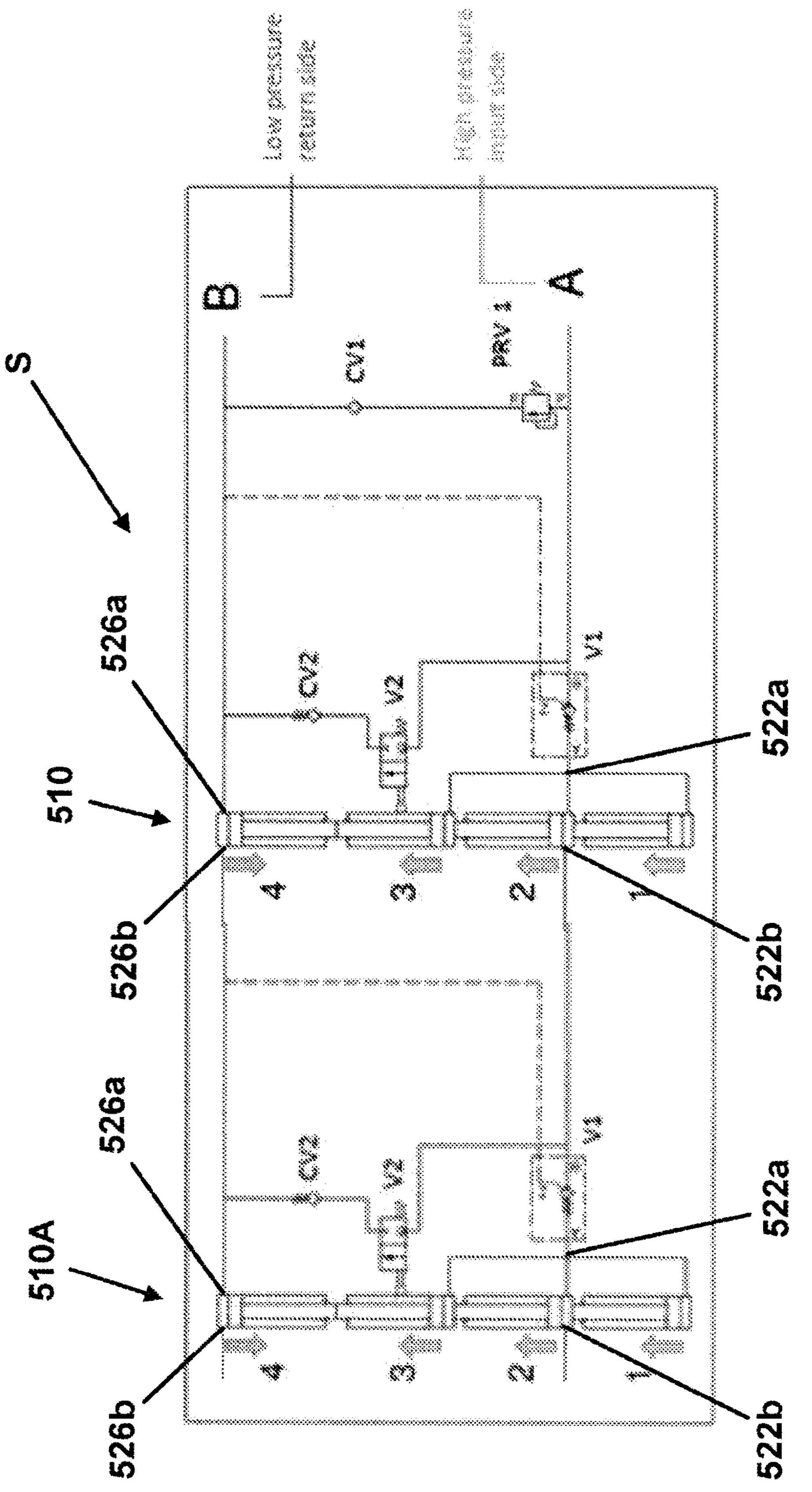
FIG. 39 is a schematic of a hydraulic circuit including the hydraulic tensioner of FIG. 25.

FIG. 38 illustrates a number of tensioning devices 510, 510A, 510B arranged in a system S of tensioning devices 510 to apply tension to a number of workpieces, such as bolts 34 (FIG. 2). FIG. 39 schematically illustrates the hydraulic circuit of the system S.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described. One or more independent features and/or independent advantages may be set forth in the following claims.

What is claimed is:

1. A tensioning device comprising:

a tensioning module including a piston and a tensioning housing supporting the piston for movement, the piston being operable to transmit force to a pulling member configured to engage a workpiece and to transmit a tensile load to the workpiece, the tensioning housing defining a tensioning port configured to receive pressurized fluid to move the piston from an initial position toward a tensioning position; and a retract module including a retract housing positioned in a stacked configuration on the tensioning housing, the retract housing defining a retract port configured to receive pressurized fluid to move the piston from the tensioning position toward the initial position.

2. The device of claim 1, wherein the tensioning module is a first tensioning module, the tensioning housing is a first tensioning housing, and the piston is a first piston, wherein the device further comprises a second tensioning module including a second piston and a second tensioning housing supporting the second piston for movement, the second tensioning housing being positioned in a stacked configuration relative to the first tensioning housing, the second piston being operable to transmit force to the pulling member, the second tensioning module being configured to receive pressurized fluid through the tensioning port to move the second piston from the initial position toward the tensioning position.

3. The device of claim 2, wherein each of the first piston and the second piston has a tensioning surface, pressurized fluid received through the tensioning port applied to the tensioning surface of the first piston and the second piston moving the first piston and the second piston from the initial position toward the tensioning position.

4. The device of claim 3, wherein the first piston has a retract surface opposite the tensioning surface, pressurized fluid received through the retract port applied to the retract surface moving the first piston from the tensioning position toward the initial position.

5. The device of claim 2, wherein the first piston abuts the second piston.

6. The device of claim 5, wherein pressurized fluid received through the retract port causes the first piston to move the second piston toward the initial position.

7. The device of claim 1, wherein the tensioning port is configured to receive pressurized fluid from a first fluid source, and wherein the retract port is configured to receive pressurized fluid from a second fluid source.

8. The device of claim 1, wherein the tensioning device is a first tensioning device, wherein the retract port is a first retract port, and wherein the retract housing defines a second retract port configured to supply pressurized fluid received through the first retract port to a second tensioning device in fluid communication with the first tensioning device.

9. The device of claim 8, wherein the tensioning port is a first tensioning port, and wherein the tensioning housing defines a second tensioning port configured to supply pressurized fluid received through the first tensioning port to the second tensioning device.

10. The device of claim 1, wherein the tensioning device is a first tensioning device, wherein the tensioning port is a first tensioning port, and wherein the tensioning housing defines a second tensioning port configured to supply pressurized fluid received through the first tensioning port to a second tensioning device in fluid communication with the first tensioning device.

11. The device of claim 1, further comprising the pulling member.

12. The device of claim 1, wherein the first piston has a tensioning surface and a retract surface, pressurized fluid received through the tensioning port applied to the tensioning surface moving the piston from the initial position toward the tensioning position, pressurized fluid received through the retract port applied to the retract surface moving the piston from the tensioning position toward the initial position.

13. A tensioning system comprising:

a first tensioning device including a tensioning module including a piston and a tensioning housing supporting the piston for movement, the piston being operable to transmit force to a first pulling member configured to engage a first workpiece and to transmit a tensile load to the first workpiece, the tensioning housing defining a tensioning port configured to receive pressurized fluid to move the piston from an initial position toward a tensioning position, and a retract module including a retract housing positioned in a stacked configuration on the tensioning housing, the retract housing defining a first retract port configured to receive pressurized fluid to move the piston from the tensioning position toward the initial position and a second retract port configured to receive pressurized fluid from the first retract port; and a second tensioning device including a tensioning module including a piston and a tensioning housing supporting the piston for movement, the piston being operable to transmit force to a second pulling member configured to engage a second workpiece and to transmit a tensile load to the second workpiece, the tensioning housing defining a tensioning port configured to receive pressurized fluid to move the piston from an initial position toward a tensioning position, and a retract module including a retract housing positioned in a stacked configuration on the tensioning housing, the retract housing defining a second tensioning device retract port configured to receive pressurized fluid to move the piston from the tensioning position toward the initial position, the second tensioning device retract port being in fluid communication with and receiving pressurized fluid from the second retract port of the first tensioning device.

14. The system of claim 13, wherein the tensioning port of the first tensioning device is a first tensioning port, wherein the tensioning housing of the first tensioning device defines a second tensioning port, the second tensioning device tensioning port being in fluid communication with and receiving pressurized fluid from the second tensioning port of the first tensioning device.

15. The system of claim 13, further comprising:

a first fluid source supplying pressurized fluid to the tensioning port of the first tensioning device; and a second fluid source supplying pressurized fluid to the first retract port, pressurized fluid from the second fluid source being supplied through the second retract port to the second tensioning device retract port.

16. The system of claim 13, further comprising a conduit fluidly connecting the second retract port and the second tensioning device retract port.

17. A method of applying tension with a tensioning system including a tensioning device, the tensioning device including a tensioning module with a piston and a tensioning housing supporting the piston for movement, the tensioning housing defining a tensioning port, and a retract module with a retract housing positioned in a stacked configuration on the tensioning housing, the retract housing defining a retract port, the method comprising:

receiving pressurized fluid through the tensioning port to move the piston from an initial position toward a tensioning position so that the piston transmits force to a pulling member configured to engage a workpiece and to transmit a tensile load to the workpiece; and thereafter, receiving pressurized fluid through the retract port to move the piston from the tensioning position toward the initial position.

18. The method of claim 17, wherein the tensioning module is a first tensioning module, the piston is a first piston, and the tensioning housing is a first tensioning housing, wherein the tensioning device includes a second tensioning module, the second tensioning module including a second piston and a tensioning housing supporting the second piston for movement, the second tensioning housing being positioned in a stacked configuration relative to the first tensioning housing, and wherein receiving pressurized fluid through the tensioning port includes, with pressurized fluid received through the tensioning port, moving the second piston from an initial position toward a tensioning position so that the second piston transmits force to the pulling member to transmit a tensile load to the workpiece.

19. The method of claim 18, wherein receiving pressurized fluid through the retract port causes the first piston to move the second piston from the tensioning position toward the initial position.

20. The method of claim 17, wherein the tensioning device is a first tensioning device, the tensioning module is a first tensioning module, the piston is a first piston, the pulling member is a first pulling member, the workpiece is a first workpiece, the tensioning housing is a first tensioning housing, the retract module is a first retract module, the retract housing is a first retract housing, and the retract port is a first retract port, the first retract housing defining a second retract port, wherein the tensioning system includes a second tensioning device, the second tensioning device including a second tensioning module with a second piston and a second tensioning housing supporting the second piston for movement, the second tensioning housing defining a second tensioning port, and a second retract module with a second retract housing positioned in a stacked configuration on the first tensioning housing, the second retract housing defining a second retract module retract port, and wherein the method further comprises:

receiving pressurized fluid through the second tensioning port to move the second piston from an initial position toward a tensioning position so that the second piston transmits force to a second pulling member configured to engage a second workpiece and to transmit a tensile load to the second workpiece; and thereafter, receiving pressurized fluid from the second retract port of the first retract module through the second retract module retract port to move the second piston from the tensioning position toward the initial position.

* * * * *